MULTIPLE PROGRAM COMPUTER

Filed Aug. 9, 1965 9 Sheets-Sheet 1

INVENTORS
CHARLES E. MACON
ROBERT S. BARTON
PAUL A. QUANTZ
GEORGE T. SHIMABUKURO

Christie, Parker & Hale
ATTORNEYS.

Dec. 19, 1967 C. E. MACON ET AL 3,359,544

MULTIPLE PROGRAM COMPUTER

Filed Aug. 9, 1965 9 Sheets-Sheet 2

Dec. 19, 1967 C. E. MACON ET AL 3,359,544

MULTIPLE PROGRAM COMPUTER

Filed Aug. 9, 1965 9 Sheets-Sheet 4

Dec. 19, 1967 C. E. MACON ET AL 3,359,544

MULTIPLE PROGRAM COMPUTER

Filed Aug. 9, 1965 9 Sheets-Sheet 6

| | ADD SEQUENCE | DESCRIPTION |
|---|---|---|
| OUTPUTS OF 586 | P0L | READ ORDER |
| | P1L | READ A OPERAND ADD. A OPERAND CH. |
| | P2L | READ B OPERAND - ADD & B OPERAND CH. |
| | P3L | ADD A+B |
| | P4L | READ RESULT ADD. & WRITE RESULT |

| SETTING CONDITIONS | OPERATIONS DURING ADD | STATES OF POINTER REG-14 FOR ADD. | | | |
|---|---|---|---|---|---|
| | | PR1FF | PR2FF | PR3FF | PR4FF |
| P0L | IDLE & SET O ORDER ADDRESS | 0 | 0 | 0 | 0 |
| P1L | SET A OPERAND ADDRESS | 1 | 0 | 0 | 0 |
| P2L | SET B OPERAND ADDRESS | 1 | 1 | 0 | 0 |
| P4L | SET C RESULT ADDRESS | 1 | 1 | 1 | 0 |

Dec. 19, 1967 C. E. MACON ET AL 3,359,544

MULTIPLE PROGRAM COMPUTER

Filed Aug. 9, 1965 9 Sheets-Sheet 8

Dec. 19, 1967 C. E. MACON ET AL 3,359,544

MULTIPLE PROGRAM COMPUTER

Filed Aug. 9, 1965 9 Sheets-Sheet 9

United States Patent Office 3,359,544
Patented Dec. 19, 1967

3,359,544

MULTIPLE PROGRAM COMPUTER

Charles E. Macon, Altadena, and Robert S. Barton, Sierra Madre, Calif., Paul A. Quantz, Doylestown, Pa., and George T. Shimabukuro, Monterey Park, Calif., assignors to Burroughs Corporation, Detroit, Mich., a corporation of Michigan Filed Aug. 9, 1965, Ser. No. 478,251
18 Claims. (Cl. 340—172.5)

This invention relates to digital computers and more particularly to improvements in electronic digital computers having an auxiliary memory device to the main memory.

Modern computing systems process a multiple of different programs. Computer systems process one program and switch over to start processing another program, depending on different conditions arising during the processing of the programs.

Computer systems are known which have a main memory device and an auxiliary memory device for storing addresses of locations in the main memory device. One such system has a plurality of different addresses in the auxiliary memory device each corresponding to a different program. A number of different demand lines are provided in the system, each demand line corresponding to one of the addresses. A traffic control circuit scans the demand lines and whenever a demand line is found with a demand signal, the corresponding address is read out of the auxiliary memory and used to address the main memory. The memory read from the auxiliary memory is incremented and rewritten back into the same memory location of the auxiliary memory.

One disadvantage of the above-noted prior art computer system is that the execution of a number of different programs is interleaved so that no one of the programs is given priority. This is due to the nature of the traffic control system which scans the demand lines and switches from address to address in the auxiliary memory, thereby causing the system to switch from program to program after each address is read from the auxiliary memory.

An additional disadvantage of the above-mentioned prior art computing system lies in the fact that it is a word oriented machine (wherein a word is read out of the main memory at a time) and is not easily converted to a character oriented machine (wherein one character is read from memory at a time), whereas, in many modern data processing applications it is desirable to use a character oriented machine. Additionally, the above-mentioned prior art computing system is expensive and is only economically feasible in large computing systems.

In contrast, the present invention is directed to a data processor which is organized in a manner which is inexpensive to construct as compared with the foregoing prior art computing system. Also, the system is arranged for executing programs on a priority basis so that one program can be completely executed before switching over and executing another program. Another feature lies in the provision of interrupt registers which allow the addresses used to address the auxiliary memory to be stored temporarily during an interrupt. Another important feature lies in the way in which order and operand addresses are stored in an auxiliary storage device and the operand addresses are read out one by one, as needed, in a sequence controlled partly by orders and used for addressing a main memory system.

Briefly, an embodiment of the present invention lies in a digital computer having main memory means and program memory means for storing a plurality of sets of program addresses. Each of the sets of program addresses comprise the addresses of an order and of an operand. A program register means is arranged for selecting one set of program addresses. A second address register means is provided for serially selecting the addresses within the selected program set. Means is provided for reading the selected program addresses of a selected program set out of the program memory means and for rewriting such addresses back into the same places in the program memory means from which they are read. Means is provided for addressing the main memory means with the read out program addresses. Means is provided for modifying the read out program address before being rewritten.

These and other aspects of the present invention will be more fully understood with reference to the following description of the drawings of which:

FIG. 2 is a schematic and block diagram showing the pointer interrupt register, the pointer register and the associated gating circuits shown in FIG. 1.

Figure 1:
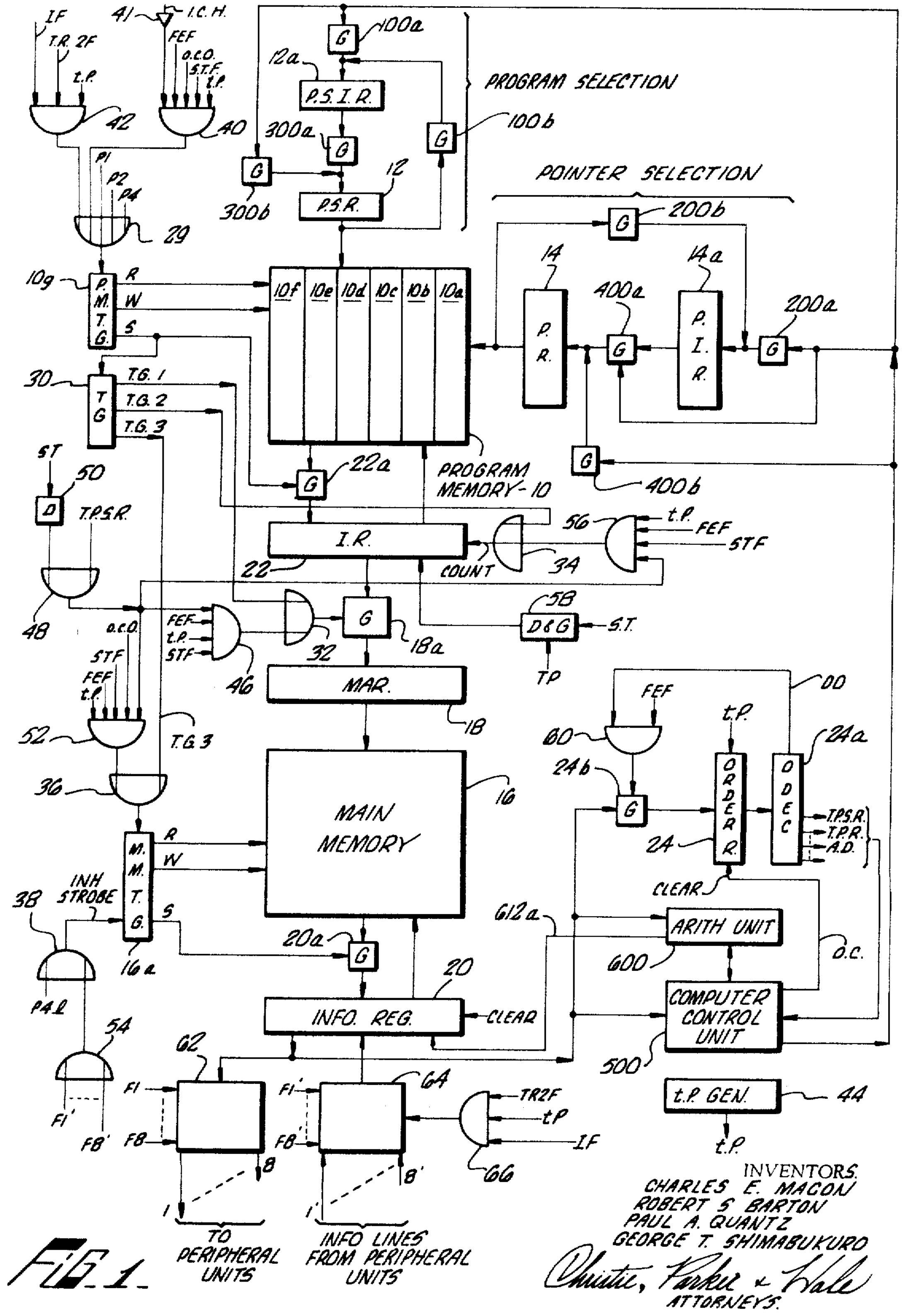
FIG. 1 is a schematic and block diagram of a computer system and embodying the present invention.
Figure 4A:
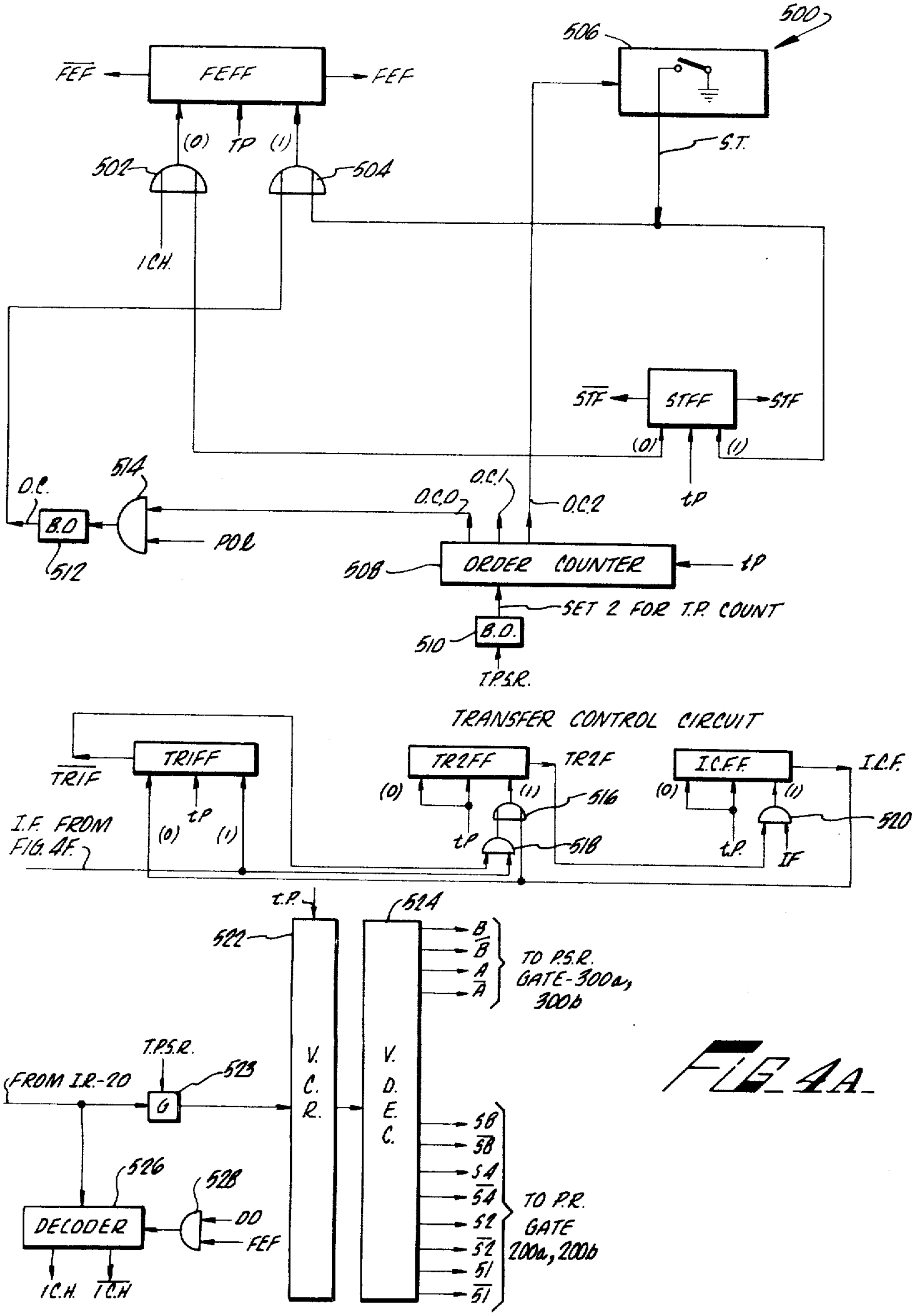
Figure 4B:
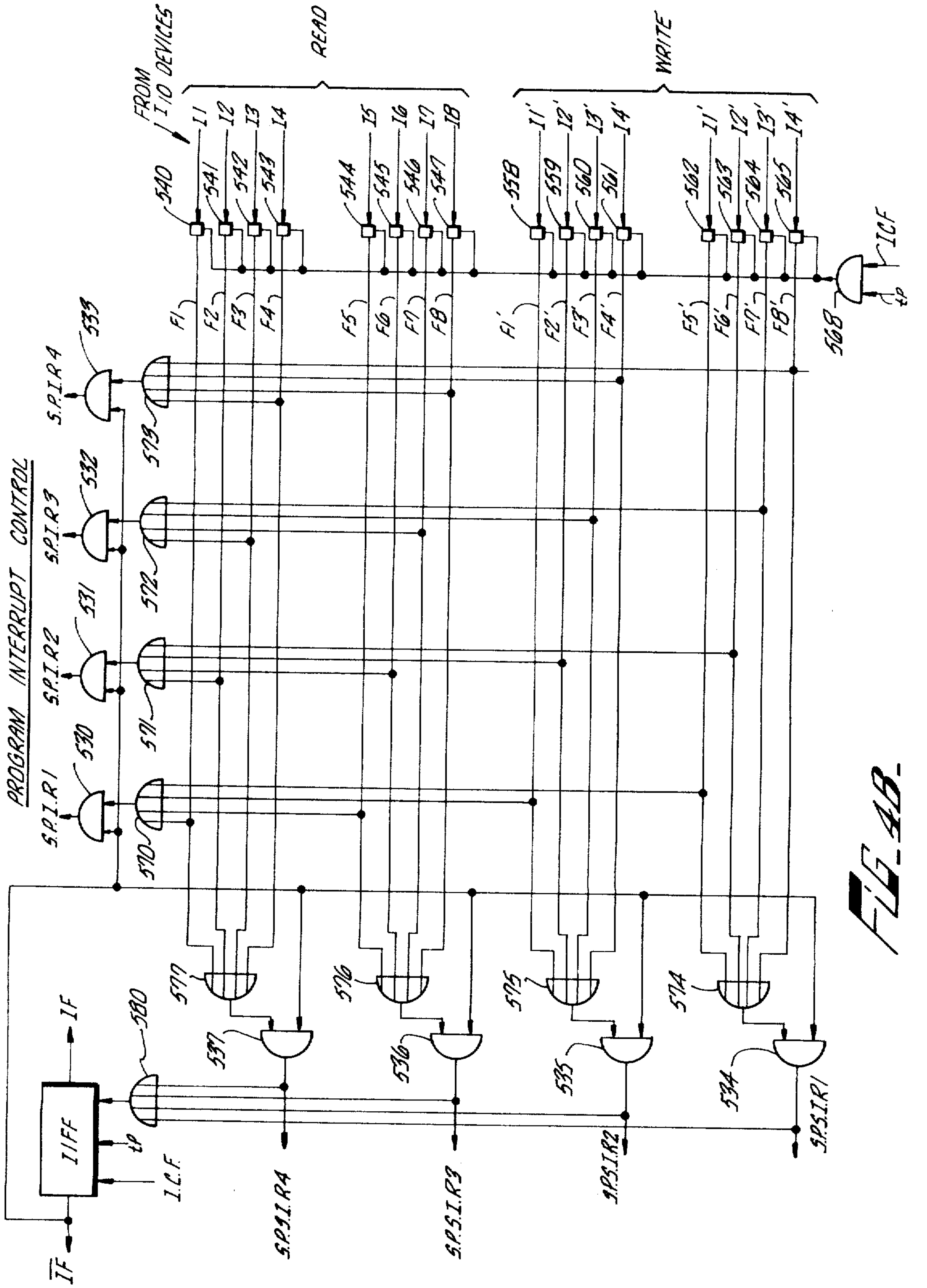
Figures 4C, 4D, 4E:
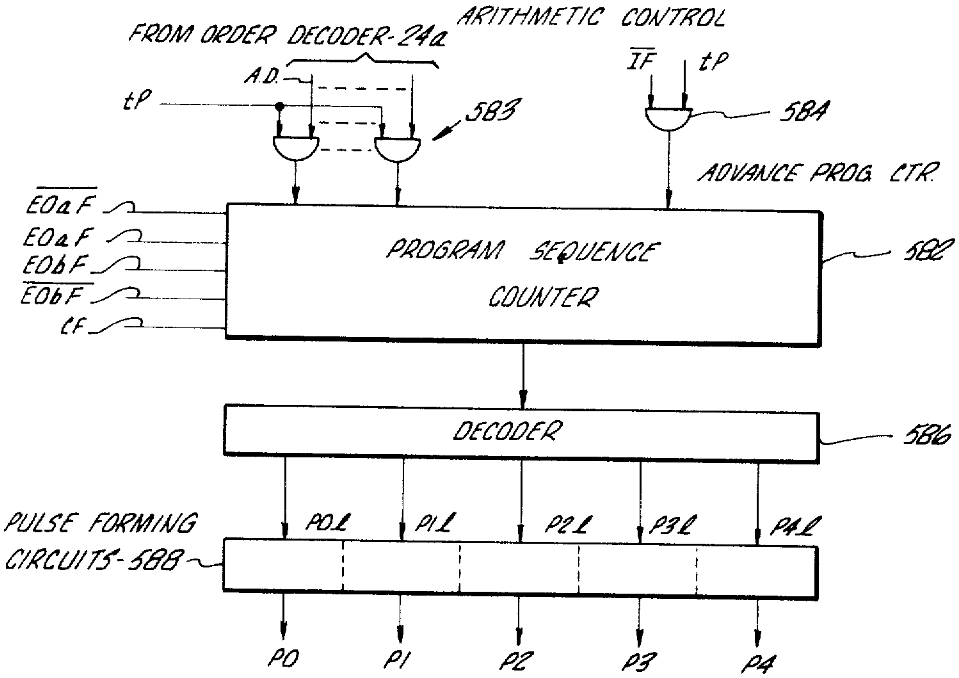
Figure 4E:
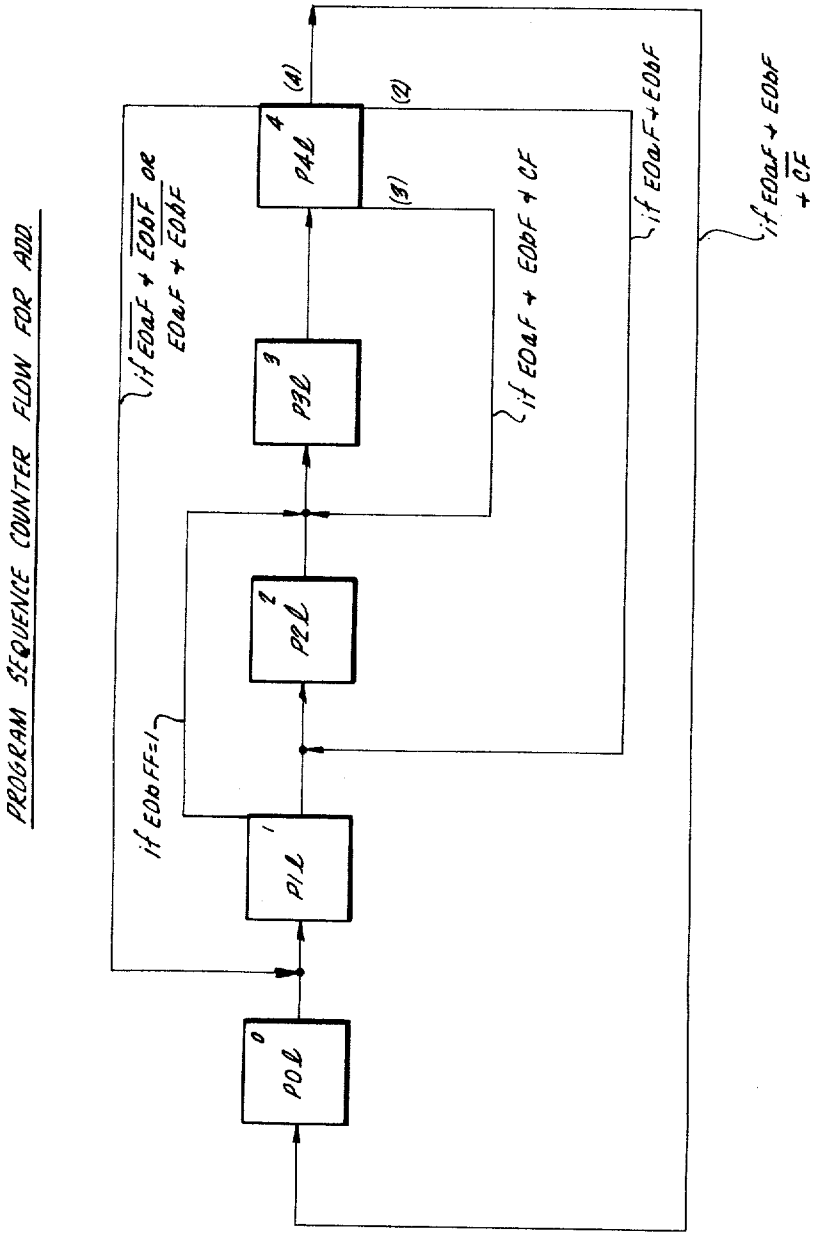

FIG. 4, including FIGS. 4A, 4B and 4C, is a schematic and block diagram of the computer control unit 500 shown in FIG. 1.

Figure 5:
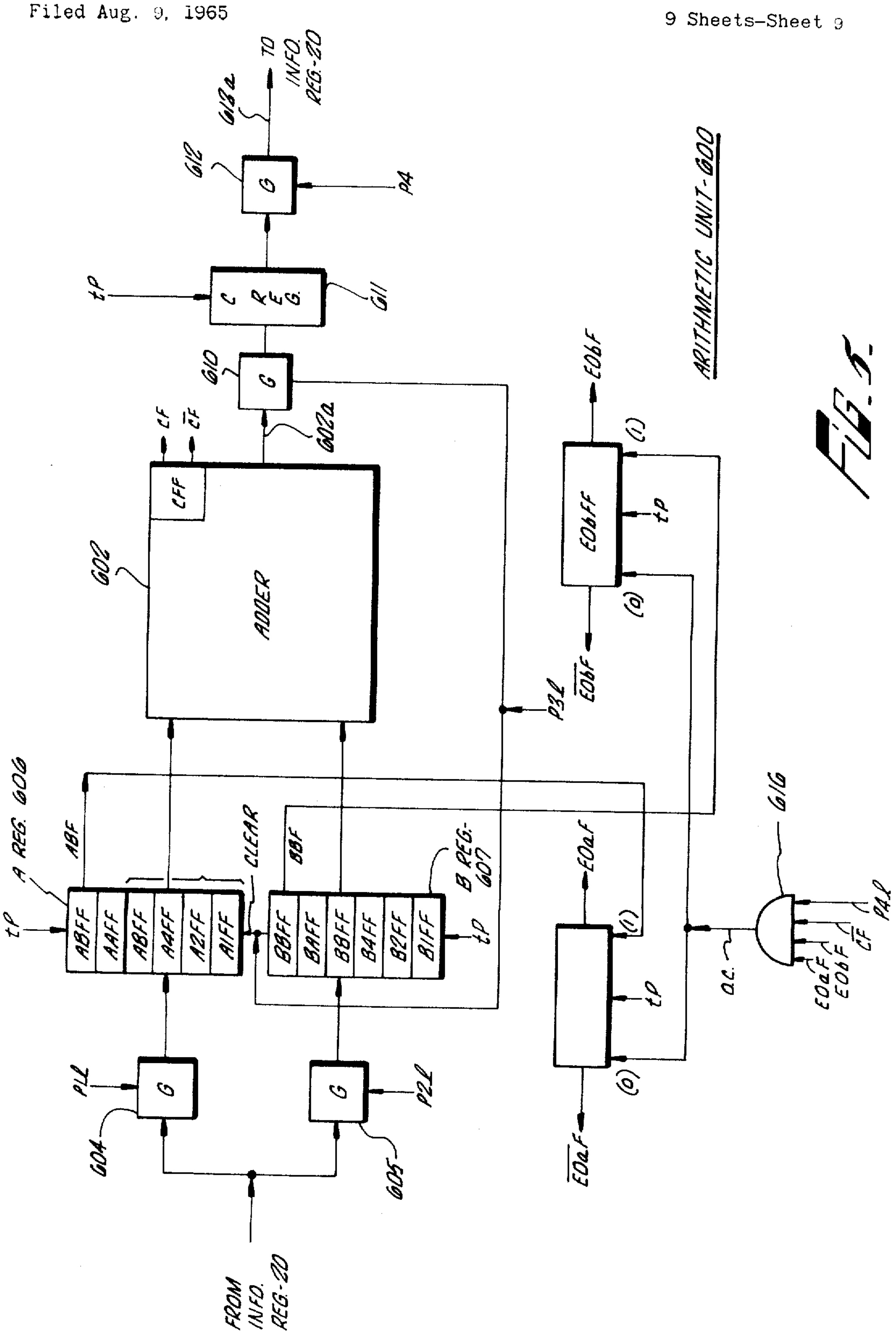

FIG. 4D is a table showing the operation which takes place during the control signals at the indicated outputs of decoder 586 while an ADD order is being executed;

FIG. 4E is a table showing the states into which the flip-flops of the pointer register 14 are set during control signals at the indicated output circuits of the decoder 586;

FIG. 4F is a flow diagram illustrating the sequence count of the program sequence counter 582 of FIG. 4C;

FIG. 5 is a schematic and block diagram of the arithmetic unit of FIG. 1.

GENERAL DESCRIPTION

Refer now to the schematic and block diagram of the computer system embodying the present invention shown in FIG. 1.

Consider first the general overall organization of the computer system. The computer system includes a magnetic core program memory 10. Associated with the program memory 10 is a program select register (PSR) 12 and a pointer register (P.R.) 14. Also included in the computer system is a conventional magnetic core main memory unit 16 which has a conventional memory address register 18 associated therewith. Both of the memories 10 and 16 are arranged for reading and writing information therein a character at a time.

Figure 1A:
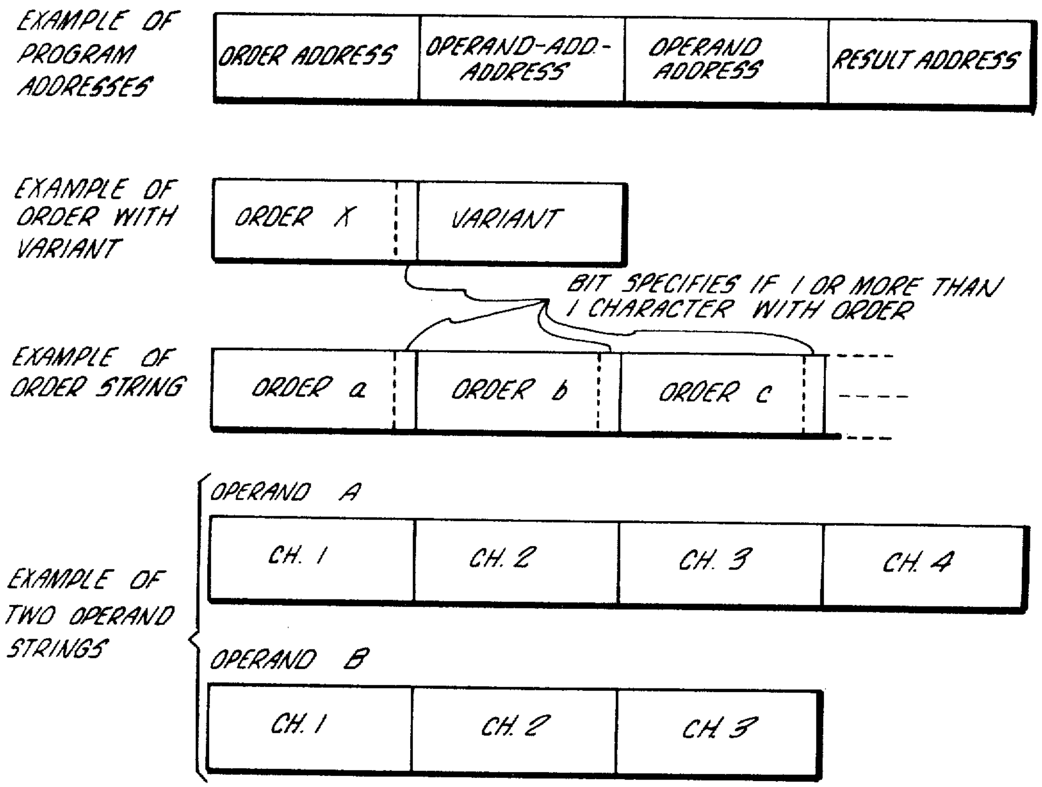
FIG. 1A is a sketch showing an example of the program addresses stored in one area of the program memory 10 of FIG. 1, an example of an order character followed by a variant, and example of an order string of characters and an example of two strings of operand characters.

Each character written into or read out of the main memory 16 is stored in an information register 20. The main memory 16 contains a program comprising a series of string of orders. FIG. 1A shows an example of an order string of a program stored in the main memory 16. Each order defines an operation to be performed by the computer system and is represented by a character.

The main memory 16 also contains operands represented by characters. Characters of the same operand are stored in sequential locations in the main memory 16 as indicated in FIG. 1A. Also in each program there are two strings of operands and the operands in each string are arranged in sequential locations.

The program memory 10, in conjunction with its associated registers and control, replaces the instruction registers normally provided in conventional computer systems. The program select register 12 stores addresses, each of which selects a different area in the program memory 10, for example, areas 10*a* through 10*f*. Each area in program memory 10 contains a number of different addresses. Each one of the program memory areas 10*a* through 10*d* store the address of an order, the addresses of operators of two different operand characters and the address for a result character. The addresses are of locations in main memory 16. The set of addresses in each of program memory areas 10*a* through 10*d* are associated with one particular program consisting of an order string in main memory 16. Therefore, in program memory areas 10*a* through 10*d* addresses for four different programs are provided.

Program memory areas 10*e* and 10*f* are physically the same as 10*a* through 10*d* but store addresses which are used for interrupt conditions. For example, an interrupt condition is used to transfer information between a peripheral device and areas 10*e* and 10*f* have the address in main memory 16 where a character is stored which is being transferred between the main memory 10 and a peripheral device.

In operation the program select register 12 stores the address selecting one of the areas 10*a* through 10*f* in the program memory 10, whereas, the pointer register 14 stores an address selecting one of the addresses in the selected area in program memory 10 where a single address is stored. The address in the selected address is read out of the program memory 10, stored in an information register 22 and is subsequently transferred to the memory address register 18. The address read out of the program memory 10 is incremented by one address in the information register 22 and is rewritten back into the same memory location in the program memory 10 from which it is read. To be explained in detail the incremented address is the address of the next character in the main memory 16 which is to be read out the next time the same address is read from the program memory 10. The program address contained in the memory address register 18 is then used to address main memory 16 and cause a character therein to be read out and stored in the information register 20.

Normally the first program address read out of the program memory 10 is the address of an order. Therefore, assuming an order is read out of the main memory 16 it is transferred from the information register 20 to an order register 24. The order contained in the order register 24 is part of the program control for determining the subsequent sequence of operation of the computer system. For example, if the order is an "add" order it causes circuits in a computer control unit 500 to modify the address contained in the pointer register 14 so that the pointer register 14 sequentially selects the operand and result addresses in the program memory area selected by the program select register 12.

For example, the pointer register 14 may first form the address of a first operand address causing the operand address to be read out, stored in the information register 22 and transferred to the memory address register 18. The first operand address contained in the memory address register 18 is then used to address and to read a character of the corresponding operand into the information register 20. The operand character is then transferred to an arithmetic unit 28. Subsequently, the computer control unit 500 modifies the address contained in the pointer register 14 causing the address of a second operand address to be selected and read out of the same area of program memory 10 and stored into the information register 22. The second operand address is transferred to the memory address register 18 and is used for addressing the main memory 16. A character of the corresponding operand is then read out into the information register 20 and subsequently transferred to the arithmetic unit 28. The arithmetic unit 28 combines the characters together and forms a result character which is stored back into the information register 20. The computer control unit 500 further modifies the address contained in the pointer register 14 causing it to select the address of a result address stored in the same area of the program memory 10. The result address is read out, transferred to the memory address register 18 and is subsequently used for addressing the main memory 16 causing the result character to be stored in the correct position in the result field of the main memory 16.

Similar to the order address, the information register 22 increments each operand and result address stored in the information register 22 and the incremented addresses are written back into the same locations of the program memory 10. In this manner the program memory 10 always contains the addresses of the next order character, operand characters and result character storage position which is to be addressed in the main memory 16.

Consider now the novel apparatus and manner for handling program interrupts. Associated with the program select register 12 is a program select interrupt register 12*a*. Similarly, a pointer interrupt register 14*a* is associated with the pointer register 14. Various conditions in the computer system cause circuits in the computer control unit 500 to form interrupt signals. Whenever an interrupt signal is formed the program being executed by the computer system is interrupted in order to handle the interrupt condition. An example of one such interrupt occurs when a peripheral device is read to store a character of information in the main memory 16. The actual character address in main memory 16 where a character is to be stored is stored in areas 10*e* and 10*f* of the program memory 10. Accordingly, the program select register 12 and the pointer register 14 are used to select such address, which hereinafter is referred to as the interrupt address. Since the registers 12 and 14 must store the address in the program memory 10 where the interrupt address can be found, it is necessary for the address for the program being executed (which is also stored in the registers 12 and 14) to be retained so that after the interrupt the computer system can return to its normal operation. To this end, circuits in the computer control unit 500 cause an address corresponding to the particular interrupt operation to be stored in the program select interrupt register 12*a* and the pointer interrupt register 14*a* via the gating circuits 100*a* and 200*a*. Subsequently, computer circuits in the computer control unit 500 cause the content of the program select interrupt register 12*a* and the program select register 12, and also cause the content of the pointer interrupt register 14*a* and the pointer register 14 to be interchanged via gating circuits 300*a*, 100*b* and 400*a*, 200*b*. Thus, following an interrupt the previous content of the program select register 12 and the pointer register 14 are stored in the program select interrupt register 12*a* and the pointer interrupt register 14*a*, respectively, and the address of the interrupt address contained in the program memory 10 is contained in the program select register 12 and the pointer register 14. The interrupt address is then read out of the program memory 10 through the information register 22 and stored in the memory address register 18. The interrupt address is then used to address the main memory 16 and to either read or write in the addressed memory location depending on whether a character is being brought in from a peripheral unit or is being sent out to a peripheral unit.

It will be noted that it takes the contents of both registers 12 and 14 (or 12*a* and 14*a*) to form a complete address for program memory 10 and the content of either 12 or 14 is merely a partial address.

DETAILED DESCRIPTION

With the general organization and operation of the computer system in mind, consider the details of the system. Associated with the magnetic core program memory 10 is a program memory timing generator 10*g*. The program memory timing generator 10*g* is a conventional timing generator for core memories which generates a read pulse (R) followed by a write pulse (W) and forms a strobe pulse (S) in coincidence with the read pulse. The read pulse causes the address contained in the location selected by the program select register 12 and the pointer register 14 to be read out and applied to a gate 22*a*. The gate 22*a* is responsive to the strobe pulse formed by the program memory timing generator 10*g* to store the read out address into the information register 22.

Each time an address is read out of the program memory 10 it is transferred to the memory address register 18, the address is counted up one in the information register 22 and the incremented address is written back into the same memory in the program memory 10. To this end, a timing generator 30 is provided which forms control signals at the TG1, TG2, and TG3 output circuits, sequentially, in response to the strobe signal formed by the program memory timing generator 10*g*. The control signal at the TG1 output circuit is sent through an OR gate 32 to a gate 18*a*. The control pulse at the TG1 output is formed after an address has been read out and stored in the information register 22 and causes the gate 32 and 18*a* to transfer the address from the information register 22 into the memory address register 18. The control pulse at the TG2 output circuit occurs after the address has been stored in the memory address register 18 and causes an OR gate 34 to apply a count signal to the information register 22. The information register 22 is arranged with gating, in a well known manner in the computer art, for counting up the address contained therein by one address in response to the control pulse from the OR gate 34.

The write pulse formed by the program memory timing generator 10*g* occurs after the address contained in the information register 22 has been counted up. Therefore, the write pulse causes the incremented address to be stored back into the same memory location of the program memory 10 (still being addressed by 12 and 14), from which it was read.

The timing generator 30 is arranged for forming a control pulse at the TG3 output after the control pulse at the TG2 output circuit causing a pulse to be applied through an OR gate 36 to a main memory timing generator 16*a*. The main memory timing generator 16*a* is similar to the program memory timing generator 10*g* and forms read (R), write (W) and strobe (S) pulses for the main memory 16 in response to a control pulse from the OR gate 36. Normally the main membory timing generator 16*a* forms a read pulse followed by a write pulse and forms a strobe pulse in coincidence with the read pulse. The read pulse causes the character contained in the memory location specified by the memory address register 18 to be read out and applied to a gate 20*a*. The strobe pulse causes the gate 20*a* to store the character read out of the main memory into the information register 20 and the write pulse causes the content of the information register 20 to be written back into the same memory location from which it was read, which location is addressed by the memory address register 18.

It is also desirable to write a character of information into the main memory 16 as opposed to reading a character out thereof. Under these conditions the character from memory formed by the read signal is not to be stored. Accordingly, the main memory timing generator 16*a* is arranged in a conventional manner in the computer for inhibiting the strobe pulse in response to a control signal from an OR gate 38, and thus the character read out is not stored into 20.

As pointed out hereinabove, the OR gate 29 applies a control pulse to the program memory timing generator 10*g* causing it to form its memory control pulses. The OR gate 29 is connected to P1, P2 and P4 output circuits from the computer control unit 26 at which control pulses are applied according to the sequence of operation of the computer system. The OR gate 29 is also connected to AND gates 40 and 42 which apply control pulses through the OR gate 29 to the program memory timing generator 10*g*. The AND gate 42 has its inputs connected to the *tp* output of a timing generator 44 and to IF and TR2F output circuits from the computer control unit 500. The AND gate 40 has its inputs connected to the *tp* output of the timing generator 44 and to the 1CH, FEF, o.c.0 and STF outputs from the computer control unit 500. The gate 40 is connected to 1CH through a conventional signal inverter 41.

As pointed out hereinabove, the OR gate 32 causes the gate 18*a* to transfer a character contained in the information register 22 into the memory address register 18. In addition to being connected to the TG1 output circuit, the OR gate 32 is connected to an AND gate 46. The AND gate 46 has input circuits connected to output circuits STF and FEF from the computer control unit 500 and to the *tp* output of the timing generator 44 and to the output circuit of an OR gate 48. The OR gate 48 has its input circuits connected through a delay circuit 50 to the ST output from the computer control unit 500 and to the TPSR output of an order (O) decoder 24*a*.

The OR gate 36 is the one which causes the main memory timing generator 16*a* to apply its memory control pulses to the main memory 16 and the gate 20*a*. In addition to being connected to the TG3 output circuit, the OR gate 36 is connected to an AND gate 52 which has its input circuits connected to the *tp* output circuit, the output circuit of the OR gate 48 and to the FEF, STF, o.c.0 output circuits from the computer control unit 500.

The OR gate 38 is the one which causes the main memory timing generator 16*a* to inhibit the strobe signal. The OR gate 38 is connected to an OR gate 54 and to a P41 output from the control unit 500. The OR gate 54 has its input circuits connected to output circuits F1′ through F8′ from the computer control unit 500.

The OR gate 34 is the one which causes the information register 22 to count up the address contained therein by one address. Count pulses are applied to the information register 22 in response to control pulses from the TG2 output circuit and also in response to a control pulse from an AND gate 56. The AND gate 56 has its input circuits connected to the output circuit of the OR gate 48, to the output circuit *tp*, and to the output circuits FEF and STF from the computer control unit 500.

A circuit is provided for storing an initial address into the information register 22 when the computer system is initially started into operation. This circuit is a decoding and gating circuit 58. The decoding and gating circuit 58 has its control circuits connected to the ST output of the computer control unit 500 and to the *tp* output of the timing generator 44. The decoding and gating circuit 58 stores the initial address into the information register 22 in response to the coincidence of control signals at the ST and *tp* output circuits.

A gate 24*a* is provided for coupling order characters, contained in the information register 20 to the order register 24. The gate 24*a* couples an order to the order register 24 in response to a control signal from an AND gate 60. The order register 24 is a conventional flip-flop register well known in the computer art for storing signals from the information register 20 only at the occurrence of a timing pulse *tp*.

Information is transferred between the computer system and peripheral units. For purposes of illustration, it is assumed that there are eight peripheral units transferring information to the computer system and receiving information therefrom. A gate 62 is provided for coupling a character stored in the information register 20 to one of eight outputs which are connected to the eight peripheral units, respectively. The gate 62 has input circuits F1 through F8 from the computer control unit 500. A control signal of one of the control lines F1 through F8 causes the character stored in the information register 20 to be coupled through the gate 62 to the correspondingly numbered output line. Thus, a signal at the line F1 causes a character to be coupled to the output circuit 1.

Similarly, a gating circuit 64 is provided for coupling characters from the eight peripheral units and for storing the characters in the information register 20. The lines numbered 1′ through 8′ are connected to the eight peripheral units, respectively, and the gate 64 stores the character applied to the input line 1′ through 8′ selected by control signals. The control signals are applied at output circuits F1′ through F8′ from the computer control unit 500, and cause the character at the correspondingly numbered output circuit to be stored in the information register 20. For example, a control signal at the F1′ output circuit causes a character applied at the input circuit 1′ to be stored into the information register 20.

The gate 64 stores characters into the information register 20 in response to strobe pulses. The strobe pulses are formed by an AND gate 66. The AND gate 66 has its input circuits connected to the output circuit *tp* from the timing generator 44 and the output circuits TR2F and IF from the computer control unit 500.

Figure 2:
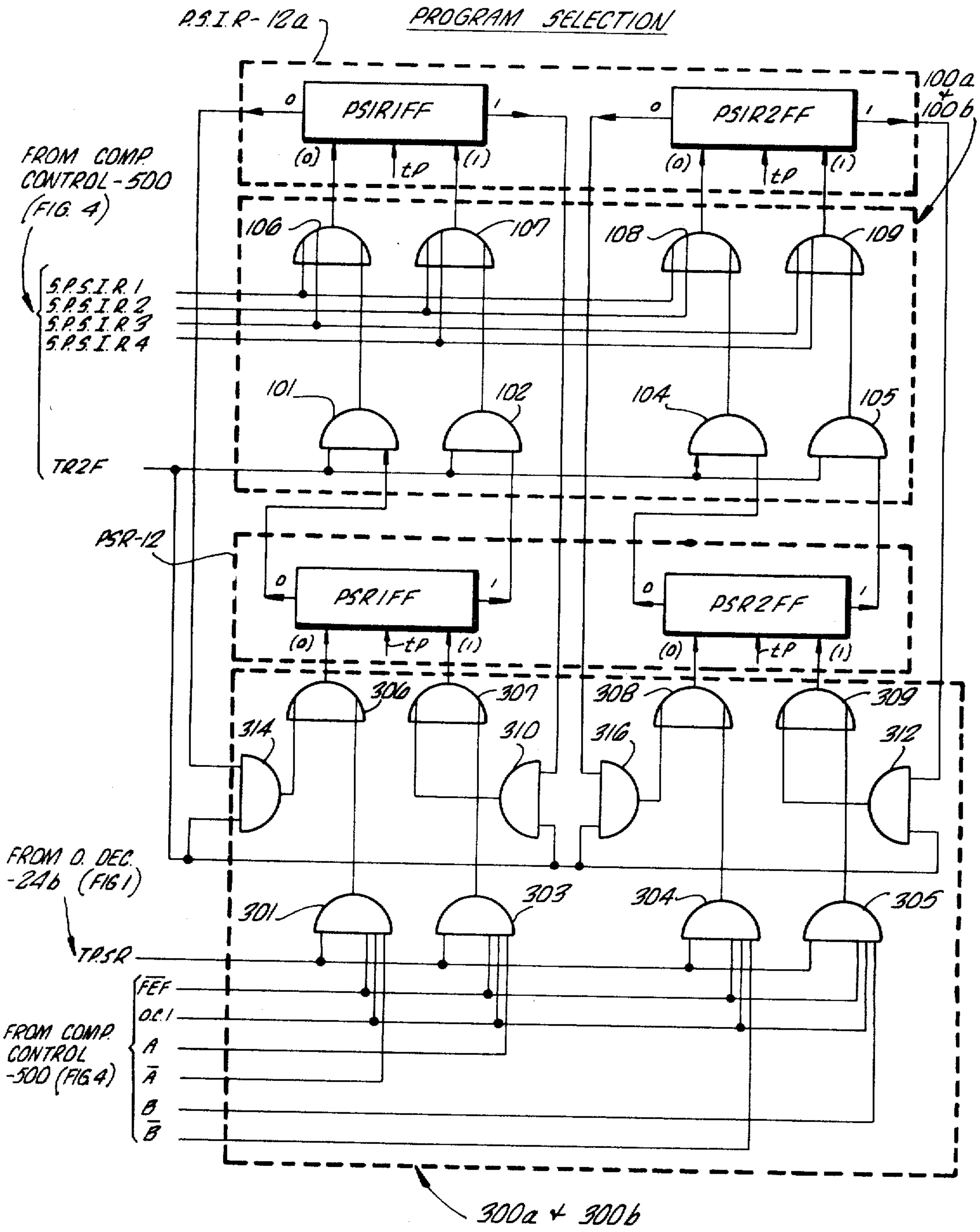
FIG. 2 is a schematic and block diagram of the program select register, the program select interrupt register and associated gating circuits shown in FIG. 1.

Refer now to the program selection portion of the computer system of FIG. 1 including the program select register 12, the program interrupt register 12*a* and the associated gating. Gating circuits 300*a* and 300*b* are functionally shown separately in FIG. 1 but actually are integrated together as shown in FIG. 2. Referring to FIG. 2, the gating circuits 300*a*, 300*b* transfer addresses from the program select interrupt register 12*a* to the program select register 12 and store new addresses into the program select register 12 during an interrupt. The signals to be stored in the program select register 12 are new signals which are stored in the program select register 12 whenever the computer system is to branch from a program, determined by the content of one of areas 10*a* through 10*d* of the program memory 10, to an address contained in areas 10*e* and 10*f* of the program memory 10. To be explained with reference to FIG. 4A, a variant control register and a variant decoder provide signals to the gating circuit 300*a*, 300*b* which determine the address to be stored into the program select register 12. These signals occur on lines referenced by the symbol, A, $\overline{A}$ B and $\overline{B}$ shown in FIG. 2 and FIG. 4A. Control signals are applied to the gating circuits 300*a*, 300*b* on lines TPSR, $\overline{FEF}$ and o.c.1 from the computer control unit 500. The lines A, $\overline{A}$, B and $\overline{B}$ are connected to AND gates 303, 301, 305 and 304, respectively. In addition, each of the AND gates 301 through 305 have input circuits connected to the output circuit TPSR, $\overline{FEF}$ and o.c.1. The output of the AND gates 301 through 305 are connected through OR gates 306 through 309 to the input of the program select register 12.

The program select register 12 consists of two flip-flops represented by the symbols PSR1FF and PSR2FF. The input of the PSR1FF and PSR2FF flip-flops for setting them into a "0" state are connected to the OR gates 306 and 308. The inputs of the flip-flops PSR1FF and PSR2FF for setting them into a "1" state are connected to the OR gates 307 and 309.

Similar to the program select register 12, the program select interrupt register 12*a* consists of two flip-flops represented by the symbols PSIR1FF and PSIR2FF. The output of the flip-flops PSIR1FF and PSIR2FF which receive control signals when in a "1" state are connected through AND gates 310 and 312 to the OR gates 307 and 309 of the gating circuit 300*a*, 300*b*. Similarly, the output circuits of the PSIR1FF and PSIR2FF flip-flops which receive signals when in a "0" state are coupled through AND gates 314 and 316 to OR gates 306, 308. Additionally, the AND gates 310 through 316 have input circuits connected to the TR2F output from the computer control unit 500. To be explained in a later discussion, a control signal is formed at the TR2F output circuit whenever the content of the program select interrupt register 12*a* and the program select register 12 are to be transferred or interchanged.

Each of the flip-flops of the program select register 12 and the program select interrupt register 12*a* have an input connected to the *tp* output circuit of the timing pulse generator 44. The flip-flops store information or are set from one state to the other in response to timing pulses formed by the timing pulse generator 44.

Similar to the gates 300*a* and 300*b* a gate 100*a* is shown in FIG. 1 for storing a new address into the program select interrupt register 12*a* and a gate 100*b* is shown for transferring an address from the program select register 12 to the program select interrupt register 12*a*. However, the gating circuits are actually integrated together as shown at 100*a*, 100*b* in FIG. 2. The gate 100*a*, 100*b* includes AND gates 101, 102, 104 and 105, each of which has an input connecter to the TR2F output circuit from the computer control unit 500. The AND gate 101 and 104 have inputs connected to the outputs of the PSR1FF and PSR2FF flip-flops which receive control signals when in a "0" state. The AND gates 103 and 105 are connected to the output circuits of the PSR1FF and PSR2FF flip-flops which receive control signals when the corresponding flip-flops are in a "1" state. The outputs of the AND gates 101, 102, 104 and 105 are coupled through OR gates 101, 102, 104 and 104 are coupled through OR gates 106, 107, 108 and 109, respectively, to the program select interrupt register 12*a*. The OR gates 106 and 108 are coupled to the input of the PSIR1FF and PSIR2FF flip-flops which cause the corresponding flip-flops to be set into a "0" state upon receipt of a control signal and a timing pulse. Similarly, the OR gates 107 and 109 are coupled to the inputs of the PSIR1FF and PSIR2FF flip-flops which cause the corresponding flip-flops to be set into a "1" state in response to a control signal in coincidence with a timing pulse.

In addition to the AND gates 101, 103, 104 and 105, the OR gates 106 and 108 have an input connected to the SPSIR1 output circuit from an interrupt control circuit shown in FIG. 4F of the computer control unit 500. Similarly, the OR gates 107 and 108 have input circuits connected to the SPSIR2 output circuit, the OR gates 106 and 109 have input circuits connected to the SPSIR3 output circuit and the OR gates 107 and 109 have input circuits connected to the SPSIR4 output circuit. The SPSIR1 through SPSIR4 output circuits are from the program interrupt control circuit shown in FIG. 4B. The control signals at these output circuits determine the partial address which is stored in the program select register 12*a*.

Figure 3:
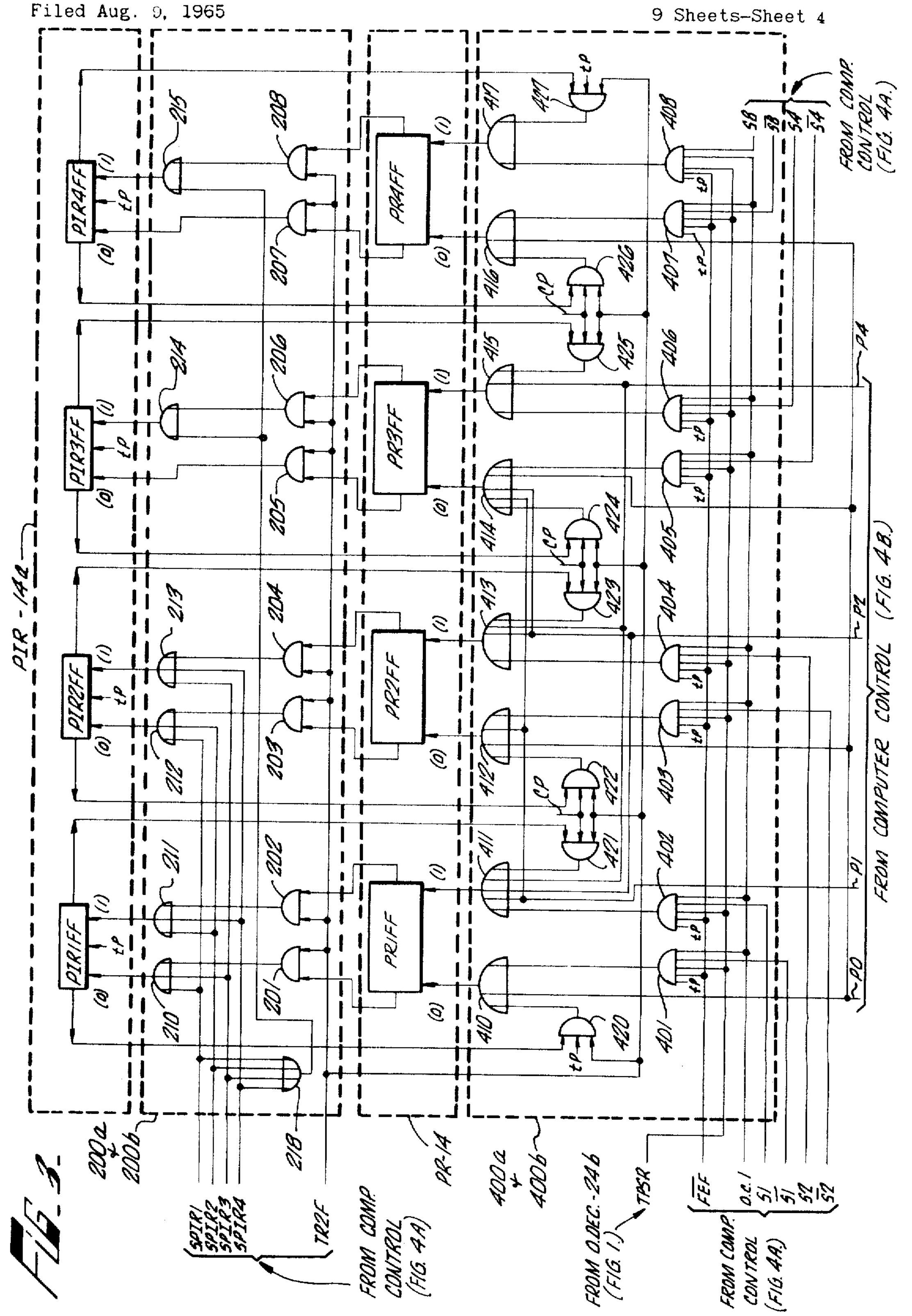

Refer now to FIG. 3 which shows the pointer selection circuitry including the pointer register 14 and the pointer interrupt register 14*a*. The pointer register 14 includes four flip-flops referenced by the symbols PR1FF, PR2FF, PR3FF and PR4FF. Similar to the program selection circuitry, FIG. 1 functionally shows two different gating circuits 400*b* and 400*a*, gating circuit 400*a* being shown for transferring information from the pointer interrupt register 14*a* to the pointer register 14 and gating 400*b* being shown for storing new partial address information into the pointer register 14. However, referring to FIG. 3, it will be noted that the gating circuits 400*a* and 400*b* are actually integrated together into one circuit.

Consider first the circuits for storing information into the pointer register 14. The gating circuits 400*a*, 400*b* include AND gating circuits 401 through 408. These gating circuits are connected to the output circuits $\overline{S1}$, S1, $\overline{S2}$, S2, $\overline{S4}$, S4, $\overline{S8}$, and S8, respectively, from the computer control 500 shown in FIG. 4A. Similar to the output circuits A, $\overline{A}$, B, $\overline{B}$, the output circuits S1, $\overline{S1}$ through S8, $\overline{S8}$ receive control signals depending on the variant character stored in the variant control register of FIG. 4A and determine the new partial addresses stored in the register 14. Also connected to the AND gates 401 through 408 are output circuits $\overline{\text{FEF}}$ and o.c.1 from the computer control 500, the output circuit TPR from the order decoder 24*b* of FIG. 1 and the *tp* output circuit of the timing generator 44. The output circuits TPR, $\overline{\text{FEF}}$ and o.c.1 determine when the partial address represented by the variant stored in the variant control register (of FIG. 4A) and signals at S1, $\overline{\text{S1}}$ through S8, $\overline{\text{S8}}$ is to be stored into the flip-flops of the pointer register 14. The timing pulse at *tp* from the timing pulse generator 44 strobes the partial address information into the appropriate flip-flops. The output of the AND gates 401 through 408 are connected to the input of OR gates 410 through 417. The output of OR gates 410, 412, 414 and 416 are connected to the input of the PR1FF, PR2FF, PR3FF and PR4FF flip-flops which cause the corresponding flip-flops to be set into a "0" state. In contrast, the OR gates 411, 413, 415 and 417 are connected to the input of the PR1FF, PR2FF, PR3FF and PR4FF flip-flops which cause the corresponding flip-flops to be set into a "1" state.

Additionally, the OR gates 410, 412, 414 and 416 which cause the corresponding flip-flops to be set into a "0" state are connected to the output circuit P0 of the pulse forming circuits in the computer control shown in FIG. 4C. Also the OR gates 411, 413 and 415, as well as gates 410, 412 and 414 which cause the corresponding flip-flops to be set into a "1" and "0" states are connected in various combinations to the output circuits P1, P2 and P4 of the pulse forming circuits shown in FIG. 4C. Control pulses are applied at the output circuits P0 through P4 which sequence the operation of the pointer register 14 during "add" and other operations. Responsive thereto the flip-flops of the pointer register 14 step through a sequence of states causing the addresses of a selected set of program addresses in one of areas 10*a* through 10*d* of the program memory 10 to be selected in the order needed for addressing the main memory 16 and executing a program.

Additionally, the OR gates 410, 411, 412, 413, 414, 415, 416 and 417 are connected to AND gates 420, 421, 422, 423, 424, 425, 426 and 427, respectively. The AND gates 420, 422, 424 and 426 each have an input circuit connected to the output circuit of the PIR1FF, PIR2FF, PIR3FF and PIR4FF flip-flops which receive a control signal when the corresponding flip-flops are in a "0" state. Similarly, the AND gates 421, 423, 425 and 427 have an input circuit connected to the output circuit of the PIR1FF, PIR2FF, PIR3FF and PIR4FF flip-flops which receive a control signal when the corresponding flip-flops are in a "1" state. The AND gates 420 through 427 cause the content of the flip-flops in the pointer interrupt register 14*a* to be stored into the corresponding flip-flops of the pointer register 14. To this end, the gates 420 through 427 have input circuits connected to the output circuits *tp* and TR2F from the computer control 500 shown in FIG. 4A.

The pointer interrupt register 14*a* has a flip-flop corresponding to each flip-flop in the pointer register 14. The pointer interrupt register 14*a* has flip-flops PIR1FF, PIR2FF, PIR3FF and PIR4FF corresponding to the correspondingly numbered flip-flops in the pointer register 14.

Similar to 400*a*, 400*b* FIG. 1 depicts a gate 200*a* for storing a new address into the pointer interrupt register 14*a* and a separate gate 200*b* for transferring an address from the pointer register 14 into the pointer interrupt register 14*a*. Referring to FIG. 3, it will be noted that actually these gating circuits, 200*a* and 200*b* are integrated into one circuit. The gating circuits 200*a*, 200*b* include AND gates 201, 203, 205 and 207 coupled between the output of the PR1FF, PR2FF, PR3FF and PR4FF flip-flops which receive a control signal when the corresponding flip-flops are in a "0" state and the "0" input of the corresponding flip-flops of the pointer interrupt register 14*a*. OR gates 210 and 212 couple the AND gates 201 and 203 to the PIR1FF and PIR2FF flip-flops whereas the AND gates 205 and 207 are connected directly to the input of the PIR3FF and PIR4FF flip-flops.

AND gates 202, 204, 206 and 208 are coupled between the output of the PR1FF, PR2FF and PR3FF and PR4FF flip-flops which receive a control signal when the corresponding flip-flops are in a "1" state and the "1" input of the corresponding flip-flops of the pointer interrupt register 14*a*. OR gates 211, 213, 214 and 215 are provided for coupling the AND gates 202, 204, 206 and 208, respectively, to the PIR1FF, PIR2FF, PIR3FF and PIR4FF flip-flops.

In addition to the flip-flops of the pointer register 14, the AND gates 201 through 208 have an input connected to the TR2F output of the TR2FF flip-flop in the computer control 500 shown in FIG. 4A. Similar to that described with reference to the program selection circuitry shown in FIG. 2, whenever a control signal is formed at the TR2F output circuit the contents of the pointer register 14 and pointer interrupt register 14*a* are interchanged by means of the gates 201 through 208 and 210 through 215 and the gates 401 through 408 and 410 through 417.

The OR gates 210 through 215 also have inputs coupled to the output circuits of the program interrupt control shown in FIG. 4B. The output circuits from the program interrupt control of FIG. 4B determine the state into which the flip-flops of the pointer interrupt register 14*a* are set to store a partial address corresponding to an interrupt. The gates 210 and 212 have inputs connected to the SPIR1 output circuit of the program interrupt control circuit of FIG. 4B. Similarly, the OR gates 211 and 212 are connected to the SPIR2 output circuit, the OR gates 210 and 213 are connected to the SPIR3 output circuits and the OR gates 211 and 213 are connected to the SPIR4 output circuit, all of the output circuits being from the program interrupt control of FIG. 4B. Additionally, the output circuits SPIR1 through SPIR4 are connected to an OR gate 218 which has its output connected to the OR gates 214 and 215.

It should be noted in passing that the signals applied to the "0" and '1" inputs of the flip-flops of the pointer register 14 are strobe or trigger pulses, whereas, the control signals applied to the "0" and "1" inputs of the pointer interrupt register 14*a* are static signals. In contrast to the pointer register 14, the pointer interrupt register 14*a* has each of its flip-flops connected directly to the timing pulse generator 44 and flip-flops are set into a state corresponding to the control signal applied thereto in response to a timing pulse.

Refer now to the computer control circuitry 500 shown in FIGS. 4A through 4C. Referring first to FIG. 4A, a fetch execute flip-flop FEFF is shown. The FEFF flip-flop is part of the control for fetching orders and associated variants and for executing the orders. In general, the FEFF flip-flop will be in a "1" state causing a control signal at the FEF output when an order and its associated variant are being read out of the main memory 16 and will be in a "0" state causing a control signal at the $\overline{\text{FEF}}$ output when the order is being executed. The input of the FEFF flip-flop for causing it to be set into a "0" state is connected to an OR gate 502. The OR gate 502 has input circuits connected to an output circuit 1CH of a decoder 526 and an output circuit o.c.2 of an order counter 508. The input of the FEFF flip-flop for causing it to be set into a "1" state is connected to an OR gate 504 which has input circuits connected to the output circuit OC of a blocking oscillator 512 and an output circuit ST of computer control circuitry 506.

The subsequent description will bring out the fact that a signal is formed at the OC output circuit whenever an operation such as the execution of an order is complete. The S.T. output of the computer control circuit 506 receives a control signal to initially start the operation of the computer system of FIG. 1. This may be done by the computer control 506 by electronic gating switches, etc. or by a mechanical switch depicted schematically in the computer control 506.

The computer control circuitry 500 also includes an STFF flip-flop. The STFF flip-flop has its input for setting it into a "1" state causing a control signal at its output STF connected to the ST output of the computer control 506 and has its input for setting it into a "0" state causing a control signal at an output circuit $\overline{STF}$ connected to the o.c.2 output of the order counter 508. Both the flip-flops FEFF and STFF receive static signals at their control input circuits. However, these flip-flops are strobed or triggered into states corresponding to their input signals by timing pulses at the *tp* output from the timing pulse generator 44.

Consider now the order counter 508 of FIG. 4A. The order counter 508 is a conventional ring-type counter which has output circuits referenced by the symbols o.c.0, o.c.1 and o.c.2. The order counter 508 has three states referred to as the 0, 1 and 2 states corresponding to the three correspondingly numbered output circuits. Initially, the order counter 508 is in state "0" and remains therein indefinitely until it receives a control signal from a blocking oscillator 510. A control signal from the blocking oscillator 510, in accordance with a timing pulse, causes the order counter 508 to be set into state "2." Once in state "2," the order counter 508 is responsive to the following two timing pulses for counting to state "1" and then to state "0."

The blocking oscillator 510 has its input connected to the output TPSR of the order decoder 24*b* (see FIG. 1). The blocking oscillator 510 is a conventional type of blocking oscillator which is responsive to each new control signal applied thereto for forming an output pulse which lasts for a length of time equal to that between the beginning of one timing pulse and the end of the next succeeding timing pulse. In this manner the order counter 508 always receives one timing pulse during the control signal from the blocking oscillator 510 and is set to state "2."

The blocking oscillator 512 has its control circuit connected to an AND gate 514. The AND gate 514 has its input circuits connected to the o.c.0 output circuit and the P0*l* output circuit of a decoder shown in FIG. 4C. The AND gate 514 applies a control signal to the blocking oscillator 512 in response to the coincidence of signals from the o.c.0 and P0*l* output circuits. Each time a new control signal is applied to the blocking oscillator 512 by the AND gate 514, the oscillator 512 forms a control pulse at the OC output circuit which lasts during one timing pulse similar to the blocking oscillator 510.

Also included in the computer control circuitry 500 are three flip-flops and associated gating which form the transfer control circuit for applying control signals at the TR2F and ICF output circuits. Included are three flip-flops referenced by the symbols TR1FF, TR2FF and ICFF. The TR1FF flip-flop has its inputs for setting it into a "0" and "1" states, respectively, connected to the output circuit IF from the IFFF flip-flop of FIG. 4B and the output circuit ICF of the ICFF flip-flop. When in a "0" state the flip-flop TR1FF applies a control signal to an output circuit $\overline{TR1F}$. The TR2FF flip-flop has its input for setting it into "0" and "1" states connected to the *tp* output circuit and to the output circuit of an OR gate 516. When in a "1" state the flip-flop TR2FF applies a control signal at an output circuit TR2F. The OR gate 516 has its input circuits connected to ICF and an AND gate 518. The AND gate 518 has input circuits connected to the output circuits IF, from the IFF flip-flop of FIG. 4B, and the $\overline{TR1F}$. The ICFF flip-flop has its input for setting it into a "0" state connected directed to the *tp* output circuit. The input of the flip-flop ICFF for setting it into a "1" state is connected to an AND gate 520. When the ICFF flip-flop is in a "1" state a control signal is formed at the ICF output circuit. The gate 520 is connected to the output circuits TR2F and IF.

Each of the flip-flops TR1FF and TR2FF and ICFF receive timing pulses from the timing pulse generator 44. The flip-flops are set into states corresponding to the input signals in response to a timing pulse.

Consider the circuits shown at the lower part of FIG. 4A. A variant control register 522 stores variant characters. A variant character, when present, always follows an order character although there is not a variant character with each order character. A gate 523 is provided for coupling variant characters to the variant control register 522. The gate 523 couples a variant character, stored into the information register 20 from memory 16, to the variant control register 522 which stores the variant character in response to a timing pulse.

A variant decoder 524 is connected to the variant control register 522. The variant decoder 524 forms a control signal at one of its output circuits represented by the symbols S1, $\overline{\textbf{S1}}$ . . . S8, $\overline{\textbf{S8}}$, A, $\overline{\textbf{A}}$, B, $\overline{\textbf{B}}$, the variant character stored in the variant control register 522. A variant character specifies the complete address to be stored in the program select register 12 and the pointer register 14.

Also connected to the output of the information register 20 is a decoder 526. Each order character stored in the information register 20 contains a designation of whether there is any variant characters associated with an order. If there are no variants and the order character is all by itself, the decoder 526 senses this information in the character stored in 20 and forms a control signal at the 1CH output thereof. The decoder 526 also has a 1CH output at which a control signal is formed if there is a variant character associated with an order. An AND gate 528 is connected to the decoder 526 and has inputs connected to a D0 output of the order decoder 20*b* and to the FEF output circuit. The decoder 526 will only form a control signal at one of its output circuits in response to a control signal from the AND gate 528.

Refer now to the program interrupt control circuity shown in FIG. 4B. The program interrupt control circuit detects input/output peripheral devices which are sending a control signal indicating the devices are sending or are ready to receive a character. Responsive thereto the program interrupt circuit forms a signal at one of the output circuits SPSIR1 through SPSIR4 to set the program select interrupt register 12*a* (see FIG. 2) and forms a signal at one of the output circuits SPIR1 through SPIR3 to set the program interrupt register 14*a* (see FIG. 3). Responsive to the output signals from the program interrupt control circuit the registers 12*a* and 14*a* are set to store an address of a location in the program memory where an interrupt address is stored corresponding to the particular peripheral device which is sending a control signal.

The SPIR1 through SPIR4 output circuits are connected to AND gating circuits 530 through 533, respectively. Similarly, the SPSIR1 through SPSIR4 output circuits are connected to AND gates 534 through 537, respectively. A control signal is formed at one, and only one, of the output circuits SPIR1 through SPIR4 and simultaneously therewith a signal is formed at one, and only one, of the output circuits SPSIR1 through SPSIR4, depending on the interrupt which is to take place. By way of example, only inputs and outputs to peripheral devices are shown as interrupt conditions but it will be evident that other types of interrupts can be used.

Refer to the input signals of the program interrupt control of FIG. 4B. Input circuits referenced by the symbols I1 through I8 and I1′ through I8′ are provided. The I1 and I1′ input circuits are connected to one of eight peripheral units which provide input character signals to the computer and/or receive output character signals from the computer for storage, etc. Similarly, the I2 and I2' through I8 and I8' are connected to seven other ones of the eight peripheral units which provide input and/ or receive output character signals for storage. The transfer of characters between peripheral devices and the computer is done via gates 62 and 64 of FIG. 1. A control signal is applied at the unprimed input signal (i.e.I1) by the corresponding peripheral unit when a read operation is to be performed in memory 16 of the computer system of FIG. 1. A read operation is to take place when a character is to be read out of the main memory 16 and sent to the corresponding peripheral unit. In contrast, a control signal is formed at the primed input circuit (i.e. I1') by the corresponding peripheral unit when the corresponding peripheral unit is providing a character to be written into the main memory 16.

The input circuits I1 through I8 and I1' through I8' are connected to flip-flops 540 through 565, respectively. The reset input of each of the flip-flops 540 through 565 is connected to a gate 568. The control signals applied to the lines I1 through I8 and I1' through I8' alone cause the corresponding flip-flops 540 through 565 to be triggered into a true state. The flip-flops 540 through 565 are reset into "0" state in response to a trigger pulse applied thereto by the gate 568 whenever a timing pulse occurs (at *tp*) in coincidence with a control signal at the ICF output circuit (from 4A). The output of the flip-flops 540 through 565, which receive a control signal when the corresponding flip-flops are in a "1" state, are connected to the input of OR gates 570 through 577. The outputs of the OR gates 570 through 577 are connected to the AND gates 530 through 537, respectively.

The AND gates 530 through 537 also have an input connected to the IF' output of the IFF flip-flop. As pointed out hereinabove flip-flops 540 through 565 are connected to the gates 570 through 577 in the combination shown in FIG. 4B so that whenever the IFF flip-flop is in a "0" state applying a control signal at the $\overline{IF}$ output, one, and only one, of the SPIR1 through SPIR4 and one, and only one, of the output circuits SPIR1 and SPIR4 output circuits receive a control signal. For example, when a control signal is applied at I1 and the flip-flop 540 is in a true state and the flip-flop I1FF is in a "0" state, the gates 530 and 537 apply a control signal to the SPIR1 and SPSIR4 output circuits. An address is then stored in the program select interrupt register **12*a* and the pointer interrupt register 14*a* which corresponds to the peripheral device connected to I1. This address is the address of a location in program memory 10 which contains an interrupt address of a location in main memory 16** where a character is to be read out for the peripheral device connected to I1.

It will also be noted that the output of each of the gates 534 through 537 are connected through an OR gate 580 to the input of the IFF flip-flop which causes it to be triggered into a "1" state. Thus, whenever an interrupt signal occurs causing a flip-flop of 540 through 565 to be triggered into a "1" state, a control signal is applied at the output circuits of one of the gates 134 through 137 which causes the OR gate 580 to apply a control signal to the IFF flip-flop. The following timing pulse causes the IFF flip-flop to be set into a "1" state.

It should also be noted that when the IFF flip-flop receives a control signal from the gate 580 and is triggered into a "1" state, the control signal at the IF' output is removed. In this manner the gates 537 block any additional interrupt signals which may occur until the first interrupt is handled by the computer system. When the interrupt has been completed a control signal is formed at the ICF output circuit by the ICFF flip-flop shown in FIG. 4A. A control signal at the ICF output in coincidence with a timing pulse causes the flip-flop I1FF to be reset to a "0" state causing another control signal at the $\overline{IF}$ output.

A control signal $\overline{IF}$ output allows another interrupt signal to be sent through the gates 530 through 537.

The computer program and control circuitry shown in FIG. 4C sequences the operation of the computer system during executions of various orders such as an "add" operation. The arithmetic control circuits of FIG. 4C includes a program sequence counter 582. The program sequence counter 582 may be constructed in any one of a number of well known manners in the computer art for counting in accordance with the order being executed. The example shown herein is only for an "add" order. The program sequence flow for the counter is during an "add" operation is shown in FIG. 4F.

The program sequence counter 582 has input circuits connected to the EO*a*F, $\overline{EOaF}$, EO*b*F and $\overline{EObF}$ output circuits of the EO*a*FF and EO*b*FF flip-flops provided in the adder shown in FIG. 5. In addition, the program sequence counter 582 has input circuits connected to AND gates 583 and an AND gate 584. The AND gate 584 is connected to the count or advance input of the program sequence counter 582. The gates 583 are connected to the control input of the program sequence counter 582. The AND gates 583 each have an input connected to the *tp* output of the timing generator 44 and to the order decoder **24*b*. Each of the AND gates 583 is connected to a different output of the order decoder 24*b* at which a control signal is applied corresponding to the type of arithmetic order stored in the order register 24. For example, one of the AND gates 583 has an input connected to the A.0 output circuit of the order decoder 24*b*. The A.0 output circuit is the one which receives a control signal whenever an "add" order is stored in the order register 24**.

Whenever a control pulse is formed at the output of one of the AND gates 583, the program sequence counter 582 is stepped from an initial state, wherein it is inhibited from counting, into a state corresponding to the order which allows the control pulses from the AND gate 584 to count the counter 582 through a sequence of steps in accordance with the type of arithmetic order stored in the order register 24. For example, with reference to the program sequence counter flow for an "add," shown in FIG. 4F, it can be seen that the program sequence counter 582 starts initially in program count "0" and goes to program count "1."

The output of the program sequence counter 582 is connected to a decoder 586. The output of the decoder 586 is connected to pulse forming circuits 588. For purposes of explanation the decoder circuit 586 is only shown with output circuits utilized during an "add" operation. Five states in the program sequence counter 582 are used during an "add" operation. These five states cause the decoder 586 to form static signals at output circuits P0*l*, P1*l*, P2*l*, P3*l* and P4*l* corresponding to the state of the program sequence counter 582. The pulse forming circuits 588 have five different individual pulse forming circuits connected to output circuits P0, P1, P2, P3 and P4. The output circuits P0 through P4 are associated with the output circuits P0*l* through P4*l*. The pulses forming circuits 588 cause a control pulse to be formed at the output circuit P0 through P4 corresponding to the associated output circuits P0*l* through P4*l* which receive a static control signal. The pulse forming circuits 588 only form one control pulse each time a new control signal is applied at the input circuit thereof by the decoder 586.

FIG. 4D is a table which shows the output circuits of the decoder 586 and corresponding thereto indicates the operation which takes place during the control signal at the indicated output circuit. For example, during the control signal at P0*l* the computer system reads an order. If the order is an "add" order then during P1*l* the address of an A operand is read out of the program memory 10 and used to read one of the A operand characters from main memory 16. During the control signal at the P2*l* output circuit the computer system reads the address of a B operand out of the program memory 10 and uses it to address the main memory 16 to read a character of the B operand. During the control signal at the P3*l* output circuit the arithmetic unit 600 (see FIG. 1) add the two characters of the A and B operands and during the control signal at the P4*l* output circuit the address of a character in the result field is read out of the program memory 10 and used to address the main memory 16 for writing the result character formed by the arithmetic unit 600 back into the main memory 16.

Consider now the program sequence counter flow of FIG. 4F for the "add" operation. Initially the program sequence counter 582 is in state "0" and a control signal is formed at the P0*l* output circuit of the decoder 586. When an "add" order is detected and the corresponding gate 583 applies a control signal to the program sequence counter 582 the program sequence counter is set into state "1" causing the decoder 586 to form a control signal at the P1*l* output circuit. To be explained in the subsequent description, an EO*b*FF flip-flop in the arithmetic unit 600 will be in a "1" state if the last character of the B operand has been read out and combined in the arithmetic unit 600. Under these conditions (EO*b*FF in a "1" state) the program sequence counter will skip and go from state "1" to state "3" wherein a control signal is formed at the **P3*l*** output circuit. However, normally the EO*b*FF flip-flop will be in a "0" state indicating that at least one character of the B operand is to be read out of the main memory and the program sequence counter 582 will count from state "1" to state "2" wherein a control signal is formed at the **P2*l*** output circuit.

Once the program sequence counter 582 is in state "2" it will count into state "3" at the occurrence of the next control pulse from the gate 584. Once the program sequence counter 582 is in state "3" it will count into state "4" wherein a control signal is formed at the P4*l* output circuit at the occurrence of the next control pulse from the gate 584.

With the program sequence counter 582 in state "4" a four-way decision is made by gating (not shown) in the program sequence counter 582. This decision is made by gating circuitry in a manner well known in the computer art. First, if neither the last character of the A operand or of the B operand has been read out and combined then the state of the EO*a*FF and EO*b*FF flip-flops are such that control signals are formed at the $\overline{\text{EO}a\text{F}}$ and $\overline{\text{EO}b\text{F}}$ output circuits. This causes the program sequence counter 582 to count from state "4" back to state "1" wherein a control signal is formed at the P1*l* output. Similarly, if the last character of the A operand has not been read out and combined but the last character of the B operand has been read out and combined, the EO*a*FF flip-flop will be in a "0" state and the EO*b*FF flip-flop will be in a "1" state causing control signals at the $\overline{\text{EO}a\text{F}}$ and $\overline{\text{EO}b\text{F}}$ output circuits. This causes the program sequence counter 582 to also step from state "4" back to state "1."

Second, if the last character of the A operand has already been read out and combined but the last character of the B operand has not been, the EO*a*FF flip-flop is in a "1" state causing a control signal at the EO*a*F output circuit whereas there is a control signal at $\overline{\text{EO}b\text{F}}$ indicating there are more B operand characters causing the program sequence counter 582 to count from state "4" back to state 2" wherein a control signal is formed at the **P2*l*** output circuit. Under these conditions, state "1" is skipped as it is the one wherein an A operand character is read and since there are no other A operand characters to be read, state "1" is skipped.

Third, if the last character of both the A operand and the B operand have been read out and combined causing a control signal at both the EO*a*F and EO*b*F output circuits and, in addition, there has been a carry from the last addition indicated by a control signal at the CF output circuit of the adder shown in FIG. 5, the program sequence counter 582 will count from state "4" back to state "3" wherein a control signal is formed at the **P3*l*** output circuit. States "1" and "2" are the ones where the A and B operand characters are read and since there are no more A and B characters to be read, states "1" and "2" can be skipped. However, since there is a carry it needs to be added to the result character during state "3."

Fourth, if the last character of both the A and B operands have already been read out and combined causing control signals at both the EO*a*F and EO*b*F output circuits and there is no carry out from the last addition, indicated by a control signal at the CF output circuit, the program sequence counter 582 counts from state "4" back to state "0" where the operation terminates.

With the details of the computer control unit 500 in mind, refer to the schematic and block diagram of the "add" circuit of the arithmetic circuit 600 as shown in FIG. 5. The adding circuits have conventional binary coded decimal full adder circuit 602. Included in the adder circuit 602 is a carry flip-flop CFF having output circuits CF and $\overline{\text{CF}}$. The sum of two characters applied at the input of the adder is formed at the output circuit **602*a***. If there is a carry out from the addition, a control signal is formed at the CF output of the carry flip-flop, whereas, a control signal is formed at the $\overline{\text{CF}}$ output circuit if there is no carry.

The adder circuit 602 is a conventional adder circuit well known in the computer art such as that shown and described in the book entitled "Digital Computer Fundamentals" by Thomas C. Bartee at pages 180 through 184, published by McGraw-Hill Book Co., Inc., 1960.

The operand characters coming into the adder circuits of FIG. 5 come from the information register 20. The output of the information register 20 is connected through gates 604 and 605 to an A operand register 606 and a B operand register 607. The A operand register 606 and the B operand register 607 are conventional flip-flop registers which store information applied thereto at the occurrence of a timing pulse. The gate 604 couples a character stored in the information register 20 to the A register 606 in response to a control signal at the **P1*l* output circuit, whereas, the gate 605 couples a character stored in the information register 20 to the B register 607 in response to a control signal at the P2*l*** output circuit.

Figure 1B:
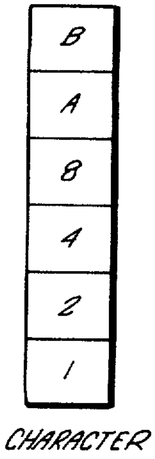
FIG. 1B is a sketch showing bit structure of a character used in the system of FIG. 1.

The A and B operands are composed of a series of characters which are stored in the main memory 16. Each of the characters has six binary coded bits. Refer now to FIG. 1B wherein an example of the character bit structure is shown. Each character has six bits referenced by the symbols 1, 2, 4, 8, A and B. The 1, 2, 4 and 8 bits represent numeric information in decimal coded form. The A bit is not of concern in regard to the present invention. The B bit is used herein to designate the last character of a string of characters in an operand from the rest of the characters in the operand. The B bit is a "1" bit, identifying the last character, only in the last character of an operand.

Referring to the registers 606 and 607, it will be noted that there are six flip-flops in each register, each for storing one of the bits of the corresponding operand character. The flip-flops in the A register 606 are represented by the symbols A1FF through A8FF, AAFF and ABFF, whereas, the flip-flops in the B register are referenced by the symbols B1FF through B8FF, BAFF and BBFF. The bits 1, 2, 4, 8, A and B of a character are stored in the correspondingly numbered and lettered flip-flops A1FF through A8FF, AAFF and ABFF of the A register and the correspondingly numbered and lettered flip-flops B1FF through B8FF, BAFF and BBFF of the B register. The B bit which designates that a character is to last one in an operand is stored in the ABFF flip-flop and the BBFF flip-flop of the registers 606 and 607, respectively. Accordingly, the BBF output of the BBFF flip-flop and the ABF output of the ABFF flip-flop receive a control signal when the corresponding flip-flops are storing a "1" bit indicating the last character of an operand is stored in the corresponding register.

Additionally, the A and B register 606 and 607 have an input connected to the P3*l* output of the decoder 586, of FIG. 4C. The A and B registers 606 and 607 have gating circuits (not shown) which reset all of the flip-flops of the corresponding registers into a "0" state at the occurrence of a clock pulse in coincidence with a control signal at the P3*l* output circuit. The output of the adder circuit 602 is coupled through a gate 610 to a C register 611. The C register 611 is a register in which a result character is stored which represents the addition of the contents of the A and B registers 606 and 607 plus any carry from a preceding addition. The gating circuit 610 is also connected to the P3*l* output circuit and couples a result character formed by the adder 602 to the C register 611 in response to a control signal at P3*l*. The register 611 stores a result character from the gate 610 in response to a timing pulse at *tp*.

A gate 612 is provided for storing a result character, stored in the C register 611, into the information register 20 in response to a control pulse at P4 from the pulse forming circuits of FIG. 4C.

The EO*a*FF and EO*b*FF flip-flops are shown at the lower portion of FIG. 5. As discussed hereinabove, the EO*a*FF flip-flop is triggered into a "1" state whenever the last character of the A operand has been read out of the main memory and sent to the arithmetic unit for processing. To this end, the input of the EO*a*FF for setting it into a "1" state is connected to the ABF output of the A register 606. Similarly, the EO*b*FF flip-flop is set into a "1" state whenever the last character of the B operand is read and to this end the input thereof for setting it into a "1" state is connected to the BBF output of the B register 607. The input of the EO*a*FF and EO*b*FF flip-flops for causing the corresponding flip-flops to be set into a "0" state are connected to the output of an AND gate 616. The AND gate 616 has input circuits connected to the output circuits EOAF, EOBF, $\overline{\text{CF}}$ and P4*l*. The EO*a*FF and EO*b*FF flip-flops are set into a state corresponding to the control signal applied thereto in response to a timing pulse at *tp*. Whenever the EO*a*FF and EO*b*FF flip-flops are in a "0" state, control signals are formed at the $\overline{\text{EO}a\text{F}}$ and $\overline{\text{EO}b\text{F}}$ output circuits, whereas, whenever the flip-flops are in a "1" state, control signals are formed at the EO*a*F and EO*b*F output circuits.

OPERATION

Three examples will be given to illustrate the operation of the computer system of FIG. 1. The three examples in the order described are as follows:

(1) Example of operation when computer system is initially started into operation and the first program set of addresses contained in the program memory 10 is selected.

(2) An example of the operation of the computer system when an ADD order is fetched and executed, and (3) An example of the operation of the computer system when an interrupt occurs.

(1) *Example of operation when computer system is initially started into operation and first program set of addresses is selected*

The operation of the system is initiated by the switch shown in the computer control 506 of FIG. 4A forming a control signal at the ST output circuit. The control signal at the ST output circuit lasts during one timing pulse from generator 44. Referring to FIG. 4A, the control signal at the ST output circuit is applied through the gate 504 to the flip-flop FEFF, to the STFF flip-flop, to the decoding and gating circuit 58 (FIG. 1) and to the delay circuit 50 (FIG. 1). Thus, the next timing pulse sets the FEFF and STFF flip-flops into a "1" state and causes an initial address to be stored in the information register 22.

Referring to FIG. 1, the delay circuit 50 is arranged for delaying the control signal applied at the ST output circuit until after the occurrence of the first timing pulse following the formation of the signal at ST. Hence, after flip-flops FEFF and STFF are set the delay circuit 50 applies a control signal through the OR gate 48 and to the gates 52 and 46. Also, a control signal is being formed at the o.c.0 output of the order counter 508 (FIG. 4A) and also at the STF and FEF output circuits of the STFF and FEFF flip-flops (FIG. 4A). Therefore, the following timing pulse causes a control pulse to be applied by the gating circuits 56 and 34 to the count input of the information register 22, causes a control pulse to be applied by the gating circuits 46 and 32 to the gate **18*a* and causes a control pulse to be applied by the gate 52 and 36 to the main memory timing generator 16*a*. This causes the initial address previously stored into the information register 22 to be stored into the memory address register 18, causes the information register 22 to count the address contained therein up by one address and causes the main memory timing generator 16*a* to start a read cycle in the main memory 16**.

It should be noted that there is a delay in the operation of the main memory timing generator **16*a* in order to allow the address contained in the information register 22 to be transferred to the memory address register 18 before the read pulse (R) is formed by the main memory timing generator 16*a*. The main memory timing generator 16*a* forms a read pulse and, in coincidence therewith, a strobe pulse causing the initial address (designated by the content of MAR–18) to be read out and stored into the information register 20 by the gate 20*a*. Subsequently, a write pulse is formed by the main memory timing generator 16*a* causing the content of the information register 20 to be stored back into the same memory location so that it is not lost from main memory 16**.

It should also be noted in connection with the main memory timing generator **16*a* that its read, write and strobe pulses are formed rapidly compared with the time between timing pulses. Thus, a character is read out of the main memory 16, stored in the information register 20 and then rewritten back into main memory 16, during a time period which is much less than that between timing pulses from generator 44. Thus, at the occurrence of the next timing pulse following the one which activates generator 16*a*, the information register 20 contains the character read from main memory 16**.

Assume that the first character read from main memory 16 is a CHANGE ADDRESS order character. A CHANGE ADDRESS order character specifies that the address contained in the program select register 12 and the pointer register 14 is to be changed to an address specified by a VARIANT character which is in the next sequential location in main memory 16 following the order character. At this point in the operation, the order decoder **24*a* applies a control signal at the D0 output circuit to the gate 60 indicating that no order has yet been stored in the order register 24. Also at this time the FEFF and STFF flip-flops are in a "1" state and a control signal is still formed at the o.c.0 output circuit. Thus, at the occurrence of the next sequential timing pulse the gates 60 and 24*a* cause the CHANGE ADDRESS order character (contained in register 20) to be stored into the order register 24, the gates 46, 32 and 18*a* cause the incremented address contained in the information register 22 to be stored into the memory address register 18, the gates 56 and 34 cause the address contained in the information register 22 to be counted up by one more address and cause the gates 52 and 36** to initiate another read cycle in the main memory timing generator 16*a*. The address stored in the memory address register 18 is the address of a VARIANT character.

The CHANGE ADDRESS order character stored in the order register 24 causes the order decoder 24*a* to remove the signal from the output D0 and apply a control signal at the output T.P.S.R. output. A signal at the T.P.S.R. output indicates that an address is to be stored in the program select register 12 and the pointer register 14 which address is specified by the VARIANT character subsequently to be stored into the variant control register 522. The order counter 508 is part of the timing for this operation and the control signal at T.P.S.R. causes the blocking oscillator 510 (FIG. 4A) to apply a control pulse to counter 508 immediately setting the counter to state "2" where a control signal is formed at o.c.2.

The character in the memory location in main memory 16 specified by the memory address register 18 is read out and stored into the information register 20 similar to that described hereinabove. As assumed hereinabove, this character is a VARIANT character. Also, at this point a control signal is formed at the o.c.2 output circuit of the order counter 508 (FIG. 4A), a control signal is applied to the gate 523 (FIG. 4A) by the T.P.S.R. output of the order decoder 24*a*, a control signal as applied to the OR gate 502 (FIG. 4A) by the o.c.2 output of the order counter 508. It should also be noted that the control signal at the o.c.0 output circuit has been removed, hence, no control signal is now applied by the gates 52 and 36 to the main memory timing generator 16*a* and, therefore a memory cycle does not take place. Therefore, at the occurrence of the next timing pulse the FEFF flip-flop is triggered into a "0" state under control of gate 502, the order counter 508 is counted into state "1" wherein a control signal is formed at the o.c.1 output circuit and the gate 523 stores the VARIANT character (contained in information register 20) into the variant control register 522 (see FIG. 4A).

With the VARIANT character stored in the variant control register 522 the variant decoder 524 (FIG. 4A) forms control signals at one of the output circuits B, $\overline{B}$, A and $\overline{A}$ and one of the output circuits S1, $\overline{S1}$ through S8, $\overline{S8}$. Thus, control signals are now applied to the gates 301 through 305 of the gating circuits 300*a* and 300*b* (FIG. 2) and to the gates 401 through 408 of the gates 400*a* and 400*b* (FIG. 3) by the variant decoder 524 which specify the address to be stored in the corresponding registers. Additionally, referring to the inputs to gates 301 to 305 and 401 to 408, the order decoder 24*a* is still applying a control signal at the T.P.S.R. output circuit and control signals are still formed at the $\overline{FEF}$ and o.c.1 circuits. Thus, at the occurrence of the next timing pulse the address represented by the VARIANT character and decoded by the variant decoder 524, is stored into the program select register 12 and the program register 14 by gates 301 to 309 and 401 to 417 (FIGS. 2 and 3). Additionally, the same timing pulse causes the order counter 508 (FIG. 4A) to count back to state "0" where a control signal is again formed at the o.c.0 output circuit.

At this point a control signal is again formed at the o.c.0 output circuit and a control signal is formed at the P0*l* output circuit (see FIG. 4C). This causes the gate 514 (FIG. 4A) to apply a control signal to the blocking oscillator 512 causing it to form a control signal at the OC output circuit. The control signal at the OC output circuit is applied through the gate 504 to the FEFF flip-flop and is also applied to the order register 24 (FIG. 1). Thus, at the occurrence of the next clock pulse the FEFF flip-flop is set into a "1" state causing another fetch cycle to take place and the content of the order register 24 is cleared to "0," removing the control signals from the T.P.S.R. output of decoder 24*a* and causing a control signal at the output circuit D0 again.

The program select register 12 and the pointer register 14 now contain a new address for the program memory 10. The program select register 12 contains a partial address selecting one of the program areas 10*a* through 10*d* of the program memory 10 and the pointer register 14 contains an address selecting one of the addresses within the selected program area.

(2) *Example of operation when an ADD order is fetched and executed*

The manner in which a new address is stored into the program select register 12 and program register 14 is described in the preceding section. Assume that the computer continues the operation from the point left off in the preceding section.

Refer now to FIG. 1. A control signal is not formed at the ICH output of the decoder 526 (FIG. 4A), therefore, the inverter circuit 41 applies a control signal to the gate 40 (FIG. 1). Additionally, the FEFF flip-flop (FIG. 4A) is in a "1" state and a control signal is formed at FEF output, the order counter 508 (FIG. 4A) is in state "0" and a control signal is formed at the o.c.0 output circuit and the STFF flip-flop (FIG. 4A) is in a "0" state causing a control signal at the $\overline{STF}$ output. Therefore, at the following timing pulse the gates 40 and 29 apply a control pulse to the program memory timing generator 10*g* causing read, write and strobe pulses to be formed for the program memory 10.

The initial partial address stored in the pointer register 14 selects the location in program memory 10 where an order address is stored. Therefore, the generator 10*g* read and strobe pulses cause an order address to be read out of program memory 10. The order address is stored into the information register 22 by the gate 22*a*. Also the strobe pulse causes the timing generator 30 to start forming control pulses. The timing generator 30 first forms a control pulse at the TG1 output causing the gate 32 to cause the gate 18*a* to store the order address contained in the information register 22 into the memory address register 18. Subsequently, the timing generator 30 forms a control pulse at the TG2 output circuit causing the gate 34 to apply a count pulse to the information register 22. The count pulse causes the information register 22 to count the order address up by one address. Subsequently, the timing generator forms a control pulse at the TG3 output circuit which causes the gate 36 to apply a timing pulse to the main memory timing generator 16*a* causing it to start a read memory cycle of operation.

Following the counting of the order address in the information register 22, the program memory timing generator 10*g* applies a write pulse to the program memory 10 causing the incremented order address (contained in the information register 22) to be stored into the program memory 10. The registers 12 and 14 contain the same address as when the original unincremented order address was read, therefore, the incremented order address is written back into the same memory location of the program memory 10 from which it was originally read. The main memory timing generator 16*a* causes the order character stored in the order address specified by the memory address register 18 to be read out and stored in the information register 20 similar to that described hereinabove in the preceding section.

It should be noted at this point that the operation of the program memory timing generator 10*g*, the timing generator 30 and the main memory timing generator 16*a* are rapid and the character is read out of the main memory 16 and stored into the information register 20 after the timing pulse triggers the program memory timing generator 10*g* into operation but before the next subsequent timing pulse occurs.

Assume that the order character stored in the information register 20 is an ADD order. With each ADD order there is a bit which designates that there is only one character in the order (i.e., there is no variant character). This condition is recognized by the decoder 526 (FIG. 4A) which applies a control signal at the ICH output circuit when a control signal is applied by the gate 528. Also at this point in the operation the order decoder **24*a* applies a control signal at the D0 output (indicating an order has not been stored into the order register 24) to the gate 60 (FIG. 1) and to the gate 528 (FIG. 4A) and a control signal is applied at the FEF output (FIG. 4A), to the gates 60 and 528. Thus, gate 528 applies a control signal to 526 causing a control signal at ICH. The control signal at ICH is applied to gate 502 (FIG. 4A). Thus, at the occurrence of the next timing pulse the FEFF flip-flop is reset into a "0" state and the gates 60 and 24*b* cause the order character (contained in register 20) to be stored into the order register 24. It should also be noted that the control signal at the ICH output also causes the inverter circuit 41 (FIG. 1) to remove the control signal from the output circuit thereof and prevents the gates 40 and 29 from initiating another read cycle in the program memory timing generator 10*g***.

The ADD order character contained in the order register 24 causes the order decoder **24*a* to apply a control signal at the A.0 output. Thus, at this point in the operation a control signal is applied to one of the gates 583 (FIG. 4C) by the A.0** output circuit, no interrupt signal has been received, therefore a control signal is formed at the $\overline{\text{IF}}$ output (see FIG. 4B) and the EO*a*FF and EO*b*FF and CFF flip-flops (FIG. 5) are still in a "0" state. Therefore, at the next timing pulse the program sequence counter 582 (FIG. 4C) is set into state "1" causing the decoder 586 to form a control signal at the **P1*l* output circuit. The control signal at the P1*l* output circuit causes the pulse forming circuits 588 to form a control pulse at the P1** output circuit.

The pulse formed at the P1 output circuit goes to two locations. First, the control pulse at P1 goes through the gate 411, 412, 414 and 416 of the gates **400*a* and 400*b* (FIG. 3) causing the PR2FF, PR3FF and PR4FF flip-flops to be reset into a "0" state and causing the PR1FF flip-flop of the pointer register 14 to be set into a "1" state. Second, the pulse at the P1 output circuit is applied through the gate 29 (FIG. 1) to the program memory timing generator 10*g* causing it to form read, write and strobe pulses as described hereinabove. It should be noted that the operation of the generator 10*g*** is delayed slightly so that the read pulse is formed after the pointer register flip-flops are set.

Referring to FIG. 4E it will be noted that the control pulse at **P1*l* causes the PR1FF flip-flop to be set into a "1" state. With the PR1FF flip-flop in a "1" state, the pointer register 14 and the program selection register 12 form the address of the A operand address stored in the selected area of program memory 10. Therefore, the A operand address is manipulated as follows: first it is read out of the selected area of program memory 10, then it is stored in the information register 22, subsequently it is stored in the memory address register 18 and incremented in the register 22. Subsequently, the incremented address is rewritten back into the same memory location of the program memory 10 from which it was originally read. Subsequently, the main memory timing generator 16*a* receives a control pulse from the TG3 output of the timing generator 30 causing it to read out the character of the A operand designated by the A operand address contained in the memory address register 18**.

Therefore, following the timing pulse which causes the program sequence counter 582 (FIG. 4C) to be set into state "1," the first character of the A operand is stored in the information register 20. Referring to FIG. 5, it will be noted that the control signal at the **P1*l* output circuit is applied to the gate 604. Therefore, at the following timing pulse the A operand character stored in the information register 20 is stored into the A register 606 through the gate 604. At the same timing pulse a control signal is formed at $\overline{\text{IF}}$ (FIG. 4B), therefore, the gate 584 causes the program sequence counter 582** (FIG. 4C) to count into state "2."

At this point in the operation a control pulse is formed at the P2 output circuit which is applied to the gates **400*a* and 400*b* (FIG. 3) and to the gate 29 (FIG. 1). Therefore, the control pulse at the P2 output circuit sets the PR2FF flip-flop of the pointer register 14 into state "1" (PR1FF having already been set) and initiates another read cycle by the program memory timing generator 10*g***.

At this point the pointer register 14 has both the PR1FF and PR2FF flip-flops in a "1" state. With reference to FIG. 4E it will be seen that the pointer register 14 and program select register 12 now contain the address of a B operand character. Therefore, the B operand address is read out of the program memory 10, transferred through the information register 22 to the memory address register 18, incremented and subsequently written back into the same memory location of the program memory 10 from which it was read. This operation is similar to that described hereinabove with respect to the order address. Subsequently, the first character of the B operand, specified by the address contained in the memory address register 18, is read out of the main memory 16, stored in the information register 20 and then transferred through the gate 605 (FIG. 5) to the B register 607, similar to that described with reference to the A register 606.

At the next timing pulse the program sequence counter 582 is counted into state "3" causing a control signal at the **P3*l* output circuit of the decoder 586 (FIG. 4E). The control signal at the P3*l* output circuit is applied to the gate 610 (FIG. 5), therefore, at the following timing pulse the sum of the two characters contained in the A and B registers 606 and 607 (which is applied at the output circuits 602*a*) is stored into the C register 611. The very same timing pulse causes the program sequence counter 582 to be counted up to state "4" and cause a control signal at P4*l***.

The control signal at the **P4*l* output circuit causes a control pulse at the P4 output circuit. The control pulse at the P4 output circuit is applied to the gate 400*a*, 400*b* (FIG. 3), to the gate 612 (FIG. 5) and to the gate 29 (FIG. 1). Therefore, the control pulse at the P4 output circuit causes the result contained in the C register 611 to be stored into the information register 20, sets the PR1FF, PR2FF and PR3FF flip-flops (actually PR1FF and PR2FF were previously set to a "1" state) into a "1" state and causes the program memory timing generator 10*g* to start another read memory operation in the program memory 10**.

At this point the pointer register 14 has its PR1FF, PR2FF and PR3FF flip-flops in a "1" state. With reference to FIG. 4E, it will be noted that with this combination of flip-flops the address of the result address in the selected area of program memory 10 is contained in the pointer register 14. Therefore, the result address is read out of the selected area of program memory 10, transferred through the information register 22 to the memory address register 18, incremented and written back into the same memory location of the program memory 10 from which it was read. During the following memory cycle of the main memory timing generator **16*a***, a control signal is applied by the output circuit P4*l* to the gate 38 (FIG. 1) causing an inhibit strobe signal to be applied to the main memory timing generator **16*a*. Therefore, the result address designated by the content of the memory address register 18 is read out but not stored in the information register 20 because a strobe signal is not formed. In this manner the result character in the information register 20 is not destroyed. At the following write pulse the result character contained in the information register 20 in written into the memory location designated by the result address in the memory address register 18**.

At the following timing pulse both the EO*a*FF and EO*b*FF flip-flops are still in a "0" state causing control signals at the $\overline{EOaF}$ and $\overline{EObF}$ output circuits. With reference to FIG. 4F it will be seen that this causes the program sequence counter 582 to be counted back to state "1."

At this point another control pulse is formed at the P1 output circuit. Referring to FIG. 3 it will be seen that the pulse at P1 resets the pointer register 14 so that only the PR1FF flip-flop is in a "1" state and causes another read operation in both the program memory 10 and the main memory 16 as described hereinabove. It should be noted at this point that not only the A operand address but the B operand address and the result address contained in the area of program memory 10 selected by the program select register 12 have been incremented by one address so that they now point at the next character of the corresponding fields in main memory 16. Therefore, the second character of the A operand is read out during state "1" of the program sequence counter 582 (FIG. 4C).

The sequence of operation described hereinabove is repeated for each character of the A and B operands until the last character of one of the operands is read. Assume that the last character of the A operand is read. During state "1" of the program sequence counter 582 an A operand character is stored into the A operand register 606 (FIG. 5). Since this is the last character the ABFF flip-flop is in a "1" state causing a control signal at ABF. Therefore, at the occurrence of the next timing pulse the EO*a*FF flip-flop is set into a "1" state. The program sequence counter 582 now goes through states "3" and "4" but will then step back to state "2" at the following clock pulse. This causes the program memory 10 and the main memory 16 and associated circuits to skip the A operand character (which have all been read) and only read out the next B operand character. The computer 600 stores the character into the B operand register 607. At this point the *a* operand register 606 contains a character "0" (having been reset to "0" during the preceding control signal at **P3*l*). Therefore, the adder circuit 602 adds the character contained in the B register 607 to the 0 character contained in 606 and combines it with any carry from the preceding addition, as represented by the carry flip-flop CFF. Therefore, in response to the subsequent control pulse at P4 the result character is stored back into the next memory location of the result field in the main memory 16** similar to that described hereinbefore. This operation continues until the last character of the B operand is read, combined and stored in the result field.

Assume that the last character of the B operand is finally stored in the B register 607. This causes the BBF output circuit to apply a control signal to the EO*b*FF flip-flop. At the following timing pulse the EO*b*FF flip-flop is set into a "1" state causing a control signal at the EOBF output circuit. Assuming that there has not been a carry, a control signal is formed at the $\overline{CF}$ output circuit of the carry flip-flop. Also a signal is still formed at the EO*a*F output. Therefore, the timing pulse formed during the control signal at the **P4*l* output circuit causes the program sequence counter 582 to be set back to state "0" and causes the gate 616** to reset the EO*a*FF and EO*b*FF flip-flops into a "0" state. The control signal at the **P0*l* output circuit subsequently causes the pulse forming circuits 588 (FIG. 4C) to apply a control pulse at the P0 output circuit and causes the gate 514 (FIG. 4A) to apply a new control signal to the blocking oscillator 512 (FIG. 4A). The control pulse at the P0 output circuit causes the gates 410, 412 and 414 (FIG. 3) to reset the corresponding flip-flops to a "0" state thereby selecting the order address of the selected memory area designated by registers 12 and 14. The blocking oscillator 512 then forms a control pulse at the OC output circuit indicating that the "add" operation is completed. The control signal at the OC output circuit lasts until after the subsequent timing pulse causing the gate 504 (FIG. 4A) to set the FEFF flip-flop into a "1" state which causes the next operator to be fetched from main memory 16** similar to that described hereinabove.

It should now be evident from the foregoing discussion that the gating **400*a* and 400*b* and the program sequence counter 582, decoder 586, pulse forming circuits 588, gates 583, decoder 24*a* and other associated circuits are coupled to the order register and form one type of program control circuits for controlling the addresses formed in the program register 14 and thereby the order in which operand addresses are read out of the program memory 10**.

(3) *Example of the operation of the computer system when an interrupt occurs*

Assume that the computer system is in the process of executing the "add" order as described in the preceding section. Assume specifically that while the program sequence counter 582 is in state "2" a control signal is being formed at the **P2*l* output circuit. Refer now to FIG. 4B and also assume that a control signal is applied by peripheral unit No. 1 to the I1 input to flip-flop 540 causing it to be triggered into a true state and cause a control signal at the F1 output. This causes the gates 577 and 570 to apply control signals to the AND gates 537 and 530. The flip-flop IFF is in a "0" state, therefore, the gates 537 and 530 apply control signals at the SPSIR4 and SPIR1 output circuits. Additionally, the gate 580** applies a control signal to the IFF flip-flop.

The clock pulse which sets the program sequence counter 582 into state "3" triggers the IFF flip-flop into a "1" state. Additionally, at the next timing pulse the flip-flops PIR1FF and PIR2FF are set into a "0" state and the flip-flops PIR3FF and PIR4FF are set into "1" states under control of gates 210 through 215 and 218 and the control signal at SPIR1 (see FIG. 3). Further, the very same timing pulse causes both of the flip-flops PSIR1FF and PSIR2FF to be set into a "1" state under control of gates 107 and 109 and the control signal at SPSIR4 (see FIG. 2). Therefore, the flip-flops of the pointer interrupt register **14*a* and the flip-flops of the program select interrupt register 12*a* contain an address of the program memory 10 having an interrupt address corresponding to the interrupt. The IFF flip-flop is now in a "1" state and a control signal is not formed at the $\overline{IF}$ output circuit. Therefore, at the following timing pulse the gate 584 (FIG. 4C) does not apply a control pulse to the program sequence counter 582 and it does not advance. However, at this very same timing pulse a control signal is applied to the flip-flop TR1FF (FIG. 4A) and to the gate 518 by the IF output circuit of flip-flop IFF. Additionally, the output circuit TR1F applies a control signal to the gate 518**. Therefore, the timing pulse under discussion triggers the TR1FF and TR2FF flip-flops into a "1" state.

At the following timing pulse the content of the registers 12 and **12*a* and the content of the registers 14 and 14*a* are interchanged and then a read cycle takes place in memory 10. To this end the following takes place: A control signal is formed at the TR2F output circuit and is applied to the gates 101 through 105 and 310 through 316 (FIG. 2), to the gates 201 through 208 and 420 through 427 (FIG. 3), to the AND gate 520 (FIG. 4A). Also a control signal from the IF output (FIG. 4B) is applied to gate 520. Therefore, the following timing pulse affects the transfer of the content of the program select register 12 and the pointer register 14 to the program select interrupt register 12*a* and the pointer interrupt register 14*a* (via the gates 300*a*, 300*b* and 400*a*, 400*b*) and affects the transfer of the content of the program select interrupt register 12*a* and the pointer interrupt register 14*a* into the program select register 12 and the pointer register 14 (via the gates 200*a*, 200*b* and 300*a*, 300*b***) (see FIGS. 2 and 3). Additionally, this same timing pulse resets the TR2FF flip-flop to a "0" state and sets the ICFF flip-flop into a "1" state.

The control signals at the IF and TR2F output circuit are applied through the gate 42 and gate 29 to the program memory timing generator 10*g* (FIG. 1). Therefore the same timing pulse which caused registers 12 and 12*a* and 14 and 14*a* to be interchanged, causes the address specified by the interrupt address now contained in the registers 12 and 14 to be read out, stored in the information register 22, transferred to the memory address register 18. The interrupt address is also incremented in the register 22 and written back into the same memory location of the program memory 10 in a manner similar to that described hereinabove. Additionally, the control pulse formed at the TG3 output of the timing generator 30 causes the main memory generator 16 to go through a read and write cycle again similar to that described hereinabove. Since a control signal was applied to the I1 interrupt line, a character is to be read out of the main memory and sent to peripheral unit No. 1. Therefore, preceding the next timing pulse the character designated by the address contained in the address register 18 is read out, stored into the information register 20 and gate 62 (FIG. 1) couples the character to the peripheral unit No. 1 under control of the signal at the output line F1 coming from the flip-flop 540 in the program interrupt control of FIG. 4B.

At this point the flip-flops IFF (FIG. 4B), ICFF and TR1FF (FIG. 4A) are in a "1" state and the TR2FF flip-flop (FIG. 4A) in a "0" state. The control signal at the ICF output is applied to the reset to "0" input of flip-flops IFF and TR1FF and to gate 568 (FIG. 4B). Also the reset to "0" input of flip-flop ICFF is connected to the IF output and the gate 516 is connected to the ICF output. Therefore, the following timing pulse resets flip-flops IFF, TR1FF, ICFF to state "0," sets flip-flop TR2FF to state "1," and resets flip-flop 540 (which was set in response to the interrupt signal at I1).

At the following timing pulse a control signal is again applied at the TR2F output circuit to the gates 101 through 105, 310 through 316 (FIG. 2), and to the gates 201 through 208, and 420 through 427 (FIG. 3). Therefore the timing pulse causes the contents of the program select register 12 and the program select interrupt register 12*a* as well as the contents of the pointer register 14 and the pointer interrupt register 14*a* to again be interchanged. Additionally, the same timing pulse causes the TR2FF flip-flop to be reset to a "0" state. It will also be noted that a control signal is no longer formed at the $\overline{IF}$ output and the same timing pulse causes the gate 584 (FIG. 4C) to advance the program sequence counter 582 to its next state of operation and causes the decoder 586 to form a control pulse at the P3 output circuit.

The program select register 12 and pointer register 14 now contain the address of the same area in program memory 10 and the same address within the memory area which it did preceding the interrupt. Accordingly, the computer system will continue on from the same point the interrupt occurred.

The foregoing interrupt operation was described assuming that a read interrupt occurred. The operation for a write interrupt caused by a signal at I1' is very similar except that during the time that the main memory timing generator 16*a* is forming read, write and strobe pulses, the gates 54 and 38 apply a control signal to the inhibit strobe input. This prevents a strobe signal from being applied to the gate 20*c* and, therefore, when the read operation takes place in the main memory 16 a character is not stored into the information register 20. This is important because at the preceding timing pulse the TR2FF and IFF flip-flops would be in a "1" state and the timing pulse would have caused the input character applied on the input line 1' coming from the peripheral unit No. 1 to be stored into the information register 20 and this character must not be destroyed before being written in memory 16. Therefore, at the following write pulse, formed by the memory timing generator 16*a*, the input character from the peripheral unit No. 1 is stored into the memory location specified by the address contained in the memory address register 18.

It should be noted that the embodiment of the invention set forth herein is given by way of example only and that there are other embodiments of the present invention within the scope of the invention defined in the following claims. For example, other interrupt conditions may cause an interrupt address to be stored into the program select interrupt register 12*a* and pointer interrupt register 14*a*, in which case the addresses in registers 12*a* and 12 and 14 and 14*a* would be interchanged in the same manner as described hereinabove. Re-arrangements of the program and pointer selection circuits within the scope of the invention are possible. For example, the address in 12 and 14 may be transferred to 12*a* and 14*a* and then the interrupt address stored directly into 12 and 14 rather than first being stored in 12*a* and 14*a*.

Also other orders may be executed by the computer system an "add" order being shown by way of example only. For example, multiply orders could be executed in which case the operand addresses would be selected in a program memory according to different rules from addition, according to the rules of multiplication. Also, the operand addresses would not be modified by one address each time but would be modified by different amounts during the multiplication process.

It should also be noted that the main memory need not be restricted to a system where reading is done a single character at a time but, for example, two characters might be read with appropriate revision of the timing and gating in the system.

What is claimed is:

1. In a digital computer the combination comprising main memory means, program memory means for storing a plurality of sets of program addresses, each of said sets of program addresses comprising the addresses of an order and an operand, program register means arranged for selecting one of said sets of program addresses, second address register means for serially selecting said addresses within the selected program set, means for reading the selected program addresses of a selected program set out of the program memory means, means for addressing said main memory means with the read out program addresses, means for modifying the read out program addresses, and means for rewriting the modified addresses back into the same places in the program memory means from which they are read.

2. In a digital computer as defined in claim 1 including means for causing said program register means to select a different program set of addresses.

3. In a digital computer the combination comprising main memory means, program memory means for storing a plurality of sets of program addresses, each of said sets of program addresses comprising the addresses of an order and an operand, program register means arranged for selecting one of said sets of program addresses, second address register means for storing a partial address for said program memory means, means including gating means arranged for modifying the partial address contained in said second address register means in a predetermined sequence thereby causing said program addresses within the selected program set to be serially selected, means for reading the selected program addresses of a selected program set out of the program memory means and means for addressing said main memory means with the read out program addresses for reading out the orders and operands stored in the main memory means.

4. In a digital computer the combination comprising main memory means, program memory means for storing a plurality of sets of program addresses, each of said sets of program addresses comprising the addresses of an order and a operand, program register means arranged for selecting one of said sets of program addresses, second address register means for serially selecting said addresses within the selected program set, means for reading the selected program addresses of a selected program set out of the program memory means and for rewriting same back into the same places in the program memory means from which they are read, means for addressing said main memory means with the read out program addresses, and means for modifying the read out program addresses to another address before being rewritten.

5. In a digital computer the combination comprising main memory means, program memory means for storing a plurality of sets of program addresses, each of said sets of program addresses comprising the addresses of an order and of at least one operand, program register means arranged for selecting one of said sets of program addresses, second address register means for selecting an address within the selected program set, means for reading the selected address of a selected program set out of the program memory means and for rewriting the address back into the same place in the program memory means from which it was read, means for addressing said main memory means with the read out order addresses and operand addresses, means for reading out the addressed locations of the main memory means, means for modifying the read out addresses to another address before being rewritten, and means responsive to a read out order for selectively causing the operand address of the corresponding program set to be selected by said second address register means and for causing the corresponding operand to be read out of the main memory means.

6. In a computer the combination comprising main memory means for storing a series of operands for processing and orders, auxiliary memory means for storing order addresses and a plurality of operand addresses associated with each order address, program register means arranged for selecting one of said sets of program addresses, second address register means for selecting an address within the selected program set, means for reading the selected addresses of a selected program set out of the program memory means and for rewriting the addresses back into the same place in the program memory means from which they are read, means for modifying the read out addresses to another address before being rewritten, means for addressing said main memory means with the read out order addresses and operand addresses, means for reading out the addressed locations of the main memory means, means for storing a read out order and means responsive to a stored order for selectively causing the second address register means to select the operand addresses associated with such stored order in a predetermined order determined in part by said stored order and thereby cause the corresponding operands to be read from the main memory means.

7. In a computer as defined in claim 6 including control means responsive at least in part to a stored order for causing said program register means to select a different order and associated operand addresses to thereby change programs.

8. In a computer as defined in claim 7 wherein a variant is stored in association with at least part of said orders designating a new program and is read out of the main memory means, and including register means for storing said variant, said control means being arranged for causing said program register to select as defined by said stored variant.

9. In a computer the combination comprising main memory means for storing a series of operands for processing and orders, an auxiliary storage means for storing at least one order address and a plurality of operand addresses associated with said order address, means for reading said order address out of the auxiliary storage means, means for reading out said operand addresses from the auxiliary storage means one by one, means for addressing the main memory means with said read out addresses, one by one, means for reading out the corresponding order and operands from said main memory means, means for storing said read out order, program circuit means coupled to the order storing means and arranged for causing the operand address reading means to read out the associated operand addresses from the auxiliary storage means in a sequence predetermined at least in part by the stored order, means for rewriting the operand addresses in the auxiliary storage means one by one, and means for modifying said operand addresses before being rewritten to thereby cause another address in main memory means to be formed, said main memory addressing means being arranged for addressing the main memory means using the operand addresses read out of the auxiliary storage means and for reading out the corresponding operands for processing in accordance with the read out order.

10. In a digital computer the combination comprising, main memory means, program memory means for storing addresses including a plurality of sets of program control addresses for said main memory means, first address register means for storing a signal selecting the control addresses in one of said sets, one by one, in a selected order, means for reading out the addresses selected by said first address register means, means for addressing the main memory means with the read out addresses, means for rewriting a read out address back into the same location of the program memory means from which it was read, means for modifying a read out address before it is rewritten, control means for selectively forming an interrupt signal, second address register means associated with said first address register means, means for storing the signal content of the first address register means into the associated second register means after said interrupt signal is formed and means arranged for storing a signal in said first program and control address register means which selects an address in said program memory means corresponding to said interrupt signal and thereby cause such address to be read out from the program memory means and used for addressing the main memory means.

11. In a digital computer as defined in claim 10 including means for restoring the content of said second address register means into said first address register means upon completion of said interrupt.

12. In a digital computer the combination comprising, main memory means, program memory means for storing addresses including a plurality of sets of program control addresses for said main memory means, first program address register means for storing a signal selecting one of said sets of program control addresses, first control address register means for storing a signal selecting one of said control addresses within a selected program set, means for reading out from the program memory means the address selected by said program and control register means, means for addressing the main memory means with the readout addresses, means for rewriting the read out control address back into the same location of the program memory means from which it was read, means for modifying the read out control address by a selected amount before it is rewritten, control means for selectively forming a plurality of unique interrupt signals, second program address register means and second control address register means associated with said first program and control address register means, respectively, means arranged for storing the signal content of the first program and control address register means into the associated second register means after an interrupt signal is formed and means arranged for storing a signal in said first program address register means and said first control address register means corresponding to the interrupt signal formed and thereby cause an address in said program memory means corresponding to such interrupt signal to be selected and read out causing the main memory means to be addressed with such address from program memory.

13. In a digital computer as defined in claim 12 including gating means arranged for transferring the signal content of both said second register means back into said first register means, and computer control means arranged for selectively causing said gating means to transfer into said first register means after the interrupt condition is complete.

14. In a character oriented computer the combination comprising main memory means for storing a series of operand characters for processing and order characters, an auxiliary memory means for storing order addresses and associated with each of at least part of the order addresses a plurality of addresses of operands, each operand address being of a single operand character, means for selecting each of said order addresses and its associated operand addresses in the auxiliary memory means one by one, means for serially reading out the addresses from the auxiliary memory means specified by said selecting means, means for addressing the main memory means with the read out order and operand addresses and for reading out the corresponding order and operand character therefrom, means for storing a read out order character, means arranged for causing said selecting means to select the operand addresses associated with the stored operator from the auxiliary memory means serially and in an order determined, at least in part, by the stored order and thereby cause the address of individual characters of the corresponding operands to be read out of the main memory in the order that the characters are needed for processing, means for rewriting the operand addresses in the auxiliary memory means, and means for modifying said read out operand addresses by a predetermined amount before being rewritten.

15. In a character oriented computer the combination comprising main memory means for storing a series of operand characters for processing and order characters, an auxiliary memory device for storing operator addresses and associated with each one of at least part of the order addresses a plurality of addresses of operands, each operand address being of a single operand character, first program address register means for selecting an order address and associated operand addresses, first control address register means for selecting the order and operand addresses one by one within the selected addresses, means for reading the selected addresses from the auxiliary memory means, means for addressing the main memory means with the read out order addresses and operand addresses and for reading out order and operand characters therefrom, means for storing a read out order, control means arranged in response to a stored order for causing the control address register means to select the operand addresses associated with such stored order, serially and in an order determined at least in part by such stored order and thereby cause the addresses of individual characters of the corresponding operands to be selected in the order that the characters are needed for processing, means for rewriting the operand addresses in the auxiliary memory means and means for modifying said operand addresses by one address before being rewritten.

16. In a character oriented computer the combination comprising main memory means for storing a series of operand characters for processing and order characters, an auxiliary memory means for storing order addresses and associated with each one of at least part of the order addresses a plurality of addresses of operands, each operand address being of a single operand character, first program address register means for selecting one of said order address and its associated operand addresses, first control address register means for selecting the order and operand addresses one by one within the selected addresses, means for serially reading the selected order and operand addresses out of the auxiliary memory means, means for addressing the main memory means with the read out order and operand addresses and for serially reading out the corresponding order and operand characters, means for storing a read out order, control means arranged for causing the control address register means to select the operand addresses associated with a stored order, serially and in an order determined at least in part by the stored order and thereby cause the addresses of individual characters of the corresponding operands to be selected and read in the order that the characters are needed for processing, means for rewriting said read out operand addresses in the auxiliary memory means, means for modifying said read out operand addresses by one address before being rewritten, means for forming a plurality of unique interrupt signals, second program address register means and second control address register means, associated with the corresponding first register means, means for selectively transferring the address contained in both said first register means to the corresponding one of said second register means, and means arranged at least in part in response to said interrupt signals for storing an address into said first register means causing the selection of an address in said auxiliary memory means corresponding to the interrupt signal which is formed.

17. In a digital computer as defined in claim 16 including gating means arranged for transferring the signal content of both said second register means back into said first register means, and computer control means arranged for selectively causing said gating means to transfer into said first register means after the interrupt condition is complete.

18. In a computer the combination comprising main memory means for storing a series of operand characters for processing and order characters, an auxiliary storage means for storing the address of at least one order character and a plurality of operand addresses associated with such order address, each operand address being the address of at least one operand character in the corresponding operand, means for reading said order address out of the auxiliary storage means, means for selectively reading out said operand addresses from the auxiliary storage means one by one, means for addressing the main memory means with said read out order address and operand addresses in the order they are read and means for reading out therefrom the corresponding order and operand characters, means for storing a read out order, program circuit means coupled to the order storing means and arranged for causing the operand address reading means to read out the associated operand addresses from the auxiliary storage means in a sequence predetermined at least in part by the stored order character, means for rewriting the operand addresses in the auxiliary storage means one by one in between the reading of addresses from the auxiliary storage means and means for modifying said operand addresses before being rewritten to thereby cause the addresses of each of the characters of the operands to be formed in a predetermined sequence, said main memory addressing means being arranged for addressing the main memory means using the operand addresses read out of the auxiliary storage means including the modified addresses and for reading out the corresponding operand characters for processing in accordance with the read out order character.

References Cited

UNITED STATES PATENTS

| | | | |
|---|---|---|---|
| 3,029,414 | 4/1962 | Schrimpf | 340—172.5 |
| 3,063,036 | 11/1962 | Reach et al. | 340—172.5 |

PAUL J. HENON, *Primary Examiner.*

R. ZACHE, *Assistant Examiner.*

UNITED STATES PATENT OFFICE
CERTIFICATE OF CORRECTION

Patent No. 3,359,544 December 19, 1967

Charles E. Macon et al.

It is hereby certified that error appears in the above numbered patent requiring correction and that the said Letters Patent should read as corrected below.

Column 2, line 28, for "FIG. 2" read -- FIG. 3 --; line 62, for "of", first occurrence, read -- or --; column 5, line 51, for "membory" read -- memory --; column 8, line 20, for "connecter" read -- connected --; line 29, strike out "gates 101, 102, 104 and 104 are coupled through OR"; line 71, for "S$\bar{1}$, S$\bar{1}$, S2" read -- $\overline{S1}$, S1, $\overline{S2}$ --; line 72, for "S2, S$\bar{4}$, S4, S$\bar{8}$" read -- S2, $\overline{S4}$, S4, $\overline{S8}$ --; line 74, for "S1, S$\bar{1}$" read -- S1, $\overline{S1}$ --; line 75, for "S$\bar{8}$" read -- $\overline{S8}$ --; column 11, line 27, for "accordance" read -- coincidence --; column 13, line 75, for "$\overline{1F}$" read -- $\overline{IF}$ --; column 17, line 71, before "forming" insert -- by --; column 19, line 54, before "circuits" insert -- output --; column 20, line 75, after "order", second occurrence, insert -- character --; column 23, line 36, for "a operand" read -- A operand --; line 45, for "hereinbefore" read -- hereinabove --.

Signed and sealed this 1st day of April 1969.

(SEAL)
Attest:

EDWARD M.FLETCHER,JR.
Attesting Officer

EDWARD J. BRENNER
Commissioner of Patents